US010992913B2

(12) United States Patent
Uemura et al.

(10) Patent No.: US 10,992,913 B2
(45) Date of Patent: Apr. 27, 2021

(54) IMAGE PROCESSING APPARATUS, METHOD, AND STORAGE MEDIUM STORING PROGRAM FOR TRANSFORMING DISTORTION OF IMAGE PROJECTED BY PROJECTION APPARATUS

(71) Applicant: CANON KABUSHIKI KAISHA, Tokyo (JP)

(72) Inventors: Shinichi Uemura, Kawasaki (JP); Eisaku Tatsumi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/437,849

(22) Filed: Jun. 11, 2019

(65) Prior Publication Data
US 2019/0394435 A1 Dec. 26, 2019

(30) Foreign Application Priority Data
Jun. 21, 2018 (JP) .............................. JP2018-118123

(51) Int. Cl.
*H04N 7/18* (2006.01)
*H04N 9/31* (2006.01)
*G06T 7/70* (2017.01)

(52) U.S. Cl.
CPC ............ *H04N 9/3185* (2013.01); *G06T 7/70* (2017.01); *H04N 9/3194* (2013.01)

(58) Field of Classification Search
CPC .................................................. H04N 9/3185
USPC ........................................................ 348/125
See application file for complete search history.

(56) References Cited

U.S. PATENT DOCUMENTS

| 7,278,746 | B2* | 10/2007 | Matthys | G03B 37/04 |
| | | | | 348/E5.144 |
| 7,364,310 | B2* | 4/2008 | Yamazaki | G03B 21/13 |
| | | | | 348/E5.144 |
| 7,936,361 | B2* | 5/2011 | Aufranc | G03B 21/26 |
| | | | | 345/640 |
| 8,885,964 | B2* | 11/2014 | Tamura | G06K 9/40 |
| | | | | 345/156 |
| 8,944,610 | B2* | 2/2015 | Nakata | H04N 9/3194 |
| | | | | 348/744 |
| 8,976,080 | B2* | 3/2015 | Richards | G09G 3/002 |
| | | | | 345/1.3 |
| 9,791,933 | B2* | 10/2017 | Igarashi | G06F 3/017 |

(Continued)

*Primary Examiner* — Leron Beck
(74) *Attorney, Agent, or Firm* — Canon U.S.A., Inc. IP Division

(57) ABSTRACT

An image processing apparatus that transforms distortion of an image projected by a projection apparatus includes an obtaining unit and a transformation unit. The obtaining unit is configured to obtain a captured image acquired by capturing a projected image including a pattern image projected by the projection apparatus. The pattern image contains at least three objects having different appearances from one area to another. The transformation unit is configured to specify a local area in the captured image and transform the local area based on a positional relationship among the at least three objects in the local area. The transformation unit transforms the local area by using a positional relationship between an object of a first appearance and an object of a second appearance in the local area and a positional relationship between the object of the first appearance and an object of a third appearance in the local area.

19 Claims, 19 Drawing Sheets

(56) References Cited

U.S. PATENT DOCUMENTS

| | | | |
|---|---|---|---|
| 10,218,949 B2* | 2/2019 | Naganuma | H04N 9/31 |
| 2003/0227599 A1* | 12/2003 | Weissman | H04N 5/74 |
| | | | 353/94 |
| 2008/0062164 A1* | 3/2008 | Bassi | H04N 9/3147 |
| | | | 345/214 |
| 2008/0174704 A1* | 7/2008 | Tan | H04N 9/3147 |
| | | | 348/745 |
| 2010/0253861 A1* | 10/2010 | Tomaru | H04N 9/3147 |
| | | | 348/745 |
| 2011/0007172 A1* | 1/2011 | Miceli | H04N 9/3147 |
| | | | 348/222.1 |
| 2012/0062855 A1* | 3/2012 | Todoroki | H04N 9/3185 |
| | | | 353/69 |
| 2014/0071409 A1* | 3/2014 | Nakashin | G03B 21/53 |
| | | | 353/69 |
| 2014/0139751 A1* | 5/2014 | Narikawa | G06T 3/005 |
| | | | 348/789 |
| 2015/0156467 A1* | 6/2015 | Ouchi | H04N 9/3185 |
| | | | 348/745 |
| 2015/0302560 A1* | 10/2015 | Sumiyoshi | G09G 3/001 |
| | | | 382/203 |
| 2016/0182873 A1* | 6/2016 | Sumiyoshi | H04N 9/3185 |
| | | | 348/747 |
| 2017/0180689 A1 | 6/2017 | Morrison | |

\* cited by examiner

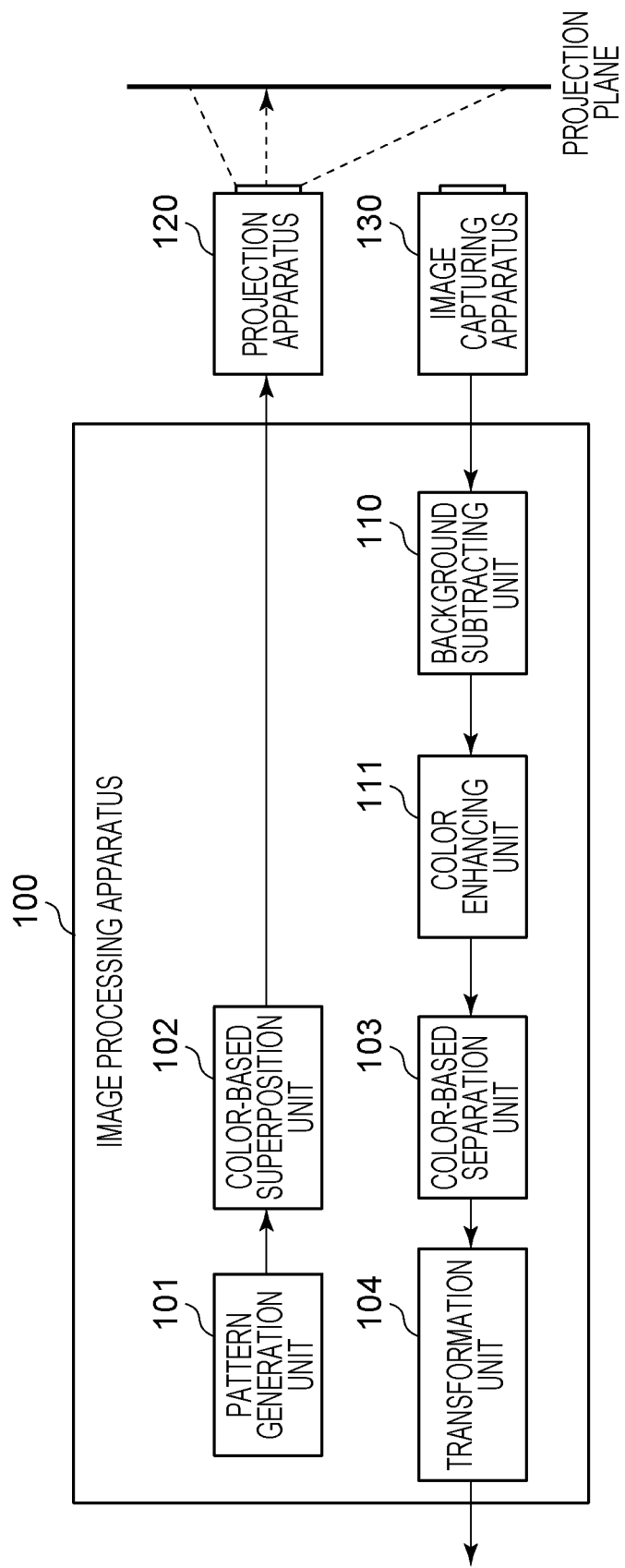

◆ SEPARATE   ● SEPARATE   ▲ SEPARATE

PROJECTIVE TRANSFORMATION

IMAGE PROCESSING APPARATUS, METHOD, AND STORAGE MEDIUM STORING PROGRAM FOR TRANSFORMING DISTORTION OF IMAGE PROJECTED BY PROJECTION APPARATUS

BACKGROUND

Field of the Disclosure

The present disclosure relates to alignment of an image projected by a projection apparatus.

Description of the Related Art

In recent years, a projection display system using a single or a plurality of projection display apparatuses (hereinafter referred to as "projection apparatus") has been known, for example, in amusement facilities and museum displays. The projection apparatus needs to generate a projection image according to the position and the distortion of the projection area so that the image is projected on a desired position of the projection plane.

US Patent Application Publication No. 2017/0180689 discloses a method for projecting a calibration pattern image from a projection apparatus, imaging the projection area with a camera, and correcting the distortion and aligning the projected image based on the result of analysis of the captured image.

The method disclosed in US Patent Application Publication No. 2017/0180689 assumes that the projection area of the captured image is rectangular in the analysis of the captured image. If the projection display apparatus or the image capturing apparatus is disposed at an angle to the projection plane, the projection area of the captured image is not always rectangular. This can lead to low-accuracy analysis of the captured image.

SUMMARY

The present disclosure provides an image processing apparatus that estimates the distortion of a projected area in a captured image obtained by capturing an area projected by a projection apparatus and that transforms the projected area to a rectangle based on the estimated distortion. In one aspect of the present disclosure, an image processing apparatus that transforms distortion of an image projected by a projection apparatus includes an obtaining unit and a transformation unit. The obtaining unit is configured to obtain a captured image acquired by capturing, with an image capturing apparatus, a projected image including a pattern image projected by the projection apparatus. The pattern image contains at least three objects having different appearances from one area to another. The transformation unit is configured to specify a local area in the captured image and transform the local area based on a positional relationship among the at least three objects in the local area. The transformation unit transforms the local area by using a positional relationship between an object of a first appearance and an object of a second appearance in the local area and a positional relationship between the object of the first appearance and an object of a third appearance in the local area.

Further features of the present disclosure will become apparent from the following description of exemplary embodiments with reference to the attached drawings.

BRIEF DESCRIPTION OF THE DRAWINGS

FIG. 8 is a block diagram illustrating, in outline, an image processing system and the logical configuration of an image processing apparatus according to one or more aspects of the present disclosure.

DESCRIPTION OF THE EMBODIMENTS

Embodiments of the present disclosure will be described hereinbelow with reference to the attached drawings. The configurations of the embodiments are given for mere illustrative purposes, and the present disclosure is not limited to the illustrated configurations.

First Embodiment

In the present embodiment, a method of image processing for alignment of a single projection display apparatus (hereinafter referred to as "projection apparatus"). The projection apparatus is disposed to project an image to a desired position on a screen. However, it is practically difficult to dispose the projection apparatus at a correct position so as to be opposed to the screen. If the projection apparatus is not opposed to the screen, the image (hereinafter referred to as "projected image") projected on the screen from the projection apparatus is distorted. For this reason, a pattern image for alignment is projected from the projection apparatus, and the captured image obtained by capturing the pattern image projected on the screen is analyzed. By analyzing the captured image, the positional relationship between the projection apparatus and the screen can be detected, and an image to be projected by the projection apparatus can be transformed in consideration of the detected positional relationship. For the analysis of the captured image, the projection area of the captured image (hereinafter referred to as "imaging projection area") has to be rectangular. Accordingly, in the present embodiment, processing for specifying the imaging projection area and transforming the imaging projection area to a rectangle is performed. The term "rectangle" herein refers to a quadrangle whose four corners have a right angle, such as a rectangle.

Figure 1:
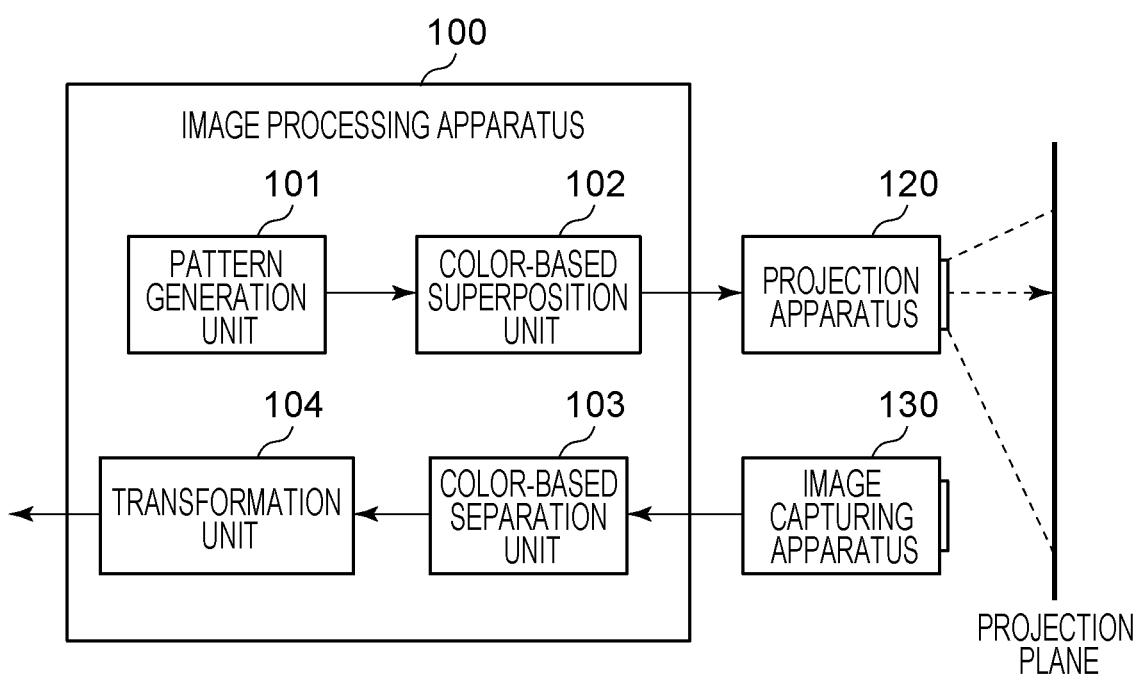
FIG. 1 is a block diagram illustrating, in outline, an image processing system and the logical configuration of an image processing apparatus according to one or more aspects of the present disclosure.

FIG. 1 is a block diagram illustrating, in outline, an image processing system and the logical configuration of an image processing apparatus of the present embodiment. The image processing system includes an image processing apparatus 100, a projection apparatus 120, and an image capturing apparatus 130. Although the projection apparatus 120 in FIG. 1 faces the projection plane (screen) for the sake of convenience, the projection apparatus 120 is actually displaced, so that it does not face the projection plane. The image capturing apparatus 130 is disposed at a position at which the projection area of the projection apparatus 120 in the projection plane can be imaged. The image capturing apparatus 130 captures an image of the projection area from a position different from the position facing the projection area. The image processing apparatus 100 executes image processing for generating an image projected by the projection apparatus 100.

Figure 4:
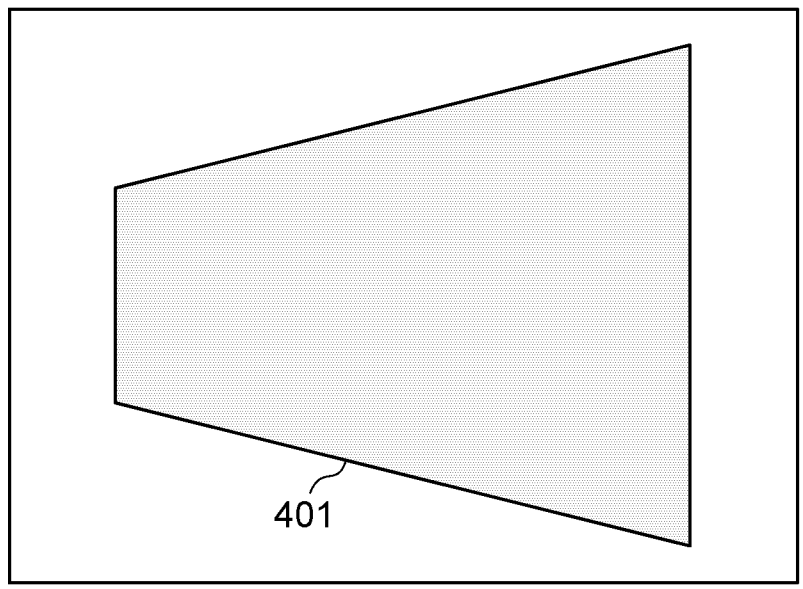
FIG. 4 is a diagram illustrating an example of a captured image.
Figure 7A:
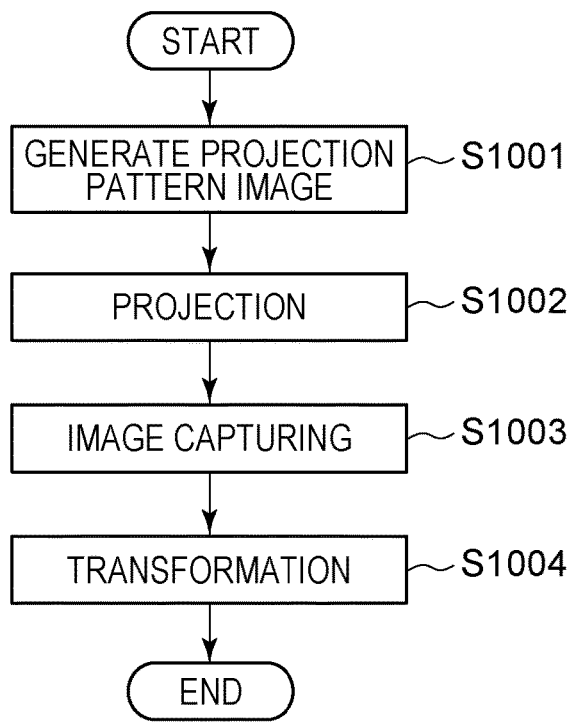
FIGS. 7A to 7C are flowcharts of the image processing system of the first embodiment.

FIG. 7A illustrates the processing procedure of the operations of the individual units of the image processing system. Each step is hereinafter expressed as "S". First at S1001, the image processing apparatus 100 generates a projection pattern image to be projected by the projection apparatus 120. At S1002, the projection apparatus 120 projects the projection pattern image on the projection plane. A projected image of the projection pattern image is projected on the projection plane. This projected image is distorted due to the positional relationship between the projection plane and the projection apparatus 120. At S1003, the image capturing apparatus 130 performs imaging so as to include the projected image on the projection plane. If the projection apparatus 120 or the image capturing apparatus 130 is disposed at an angle with respect to the projection plane, the projected image is captured in a distorted manner. FIG. 4 is a diagram illustrating an example the captured image. An area 401 is a distorted projection area. FIG. 4 does not illustrate a pattern in the image projected on the projection area 401. The image capturing apparatus 130 outputs the captured image. At S1004, the image processing apparatus 100 transforms the projection area to a rectangular shape based on the captured image.

Processing performed by the image processing apparatus 100 will be described in detail. The image processing apparatus 100 includes a pattern generation unit 101, a color-based superposition unit 102, a color-based separation unit 103, and a transformation unit 104. Although FIG. 1 illustrates a case of a single projection apparatus, a plurality of projection apparatuses may be provided.

Figure 2:
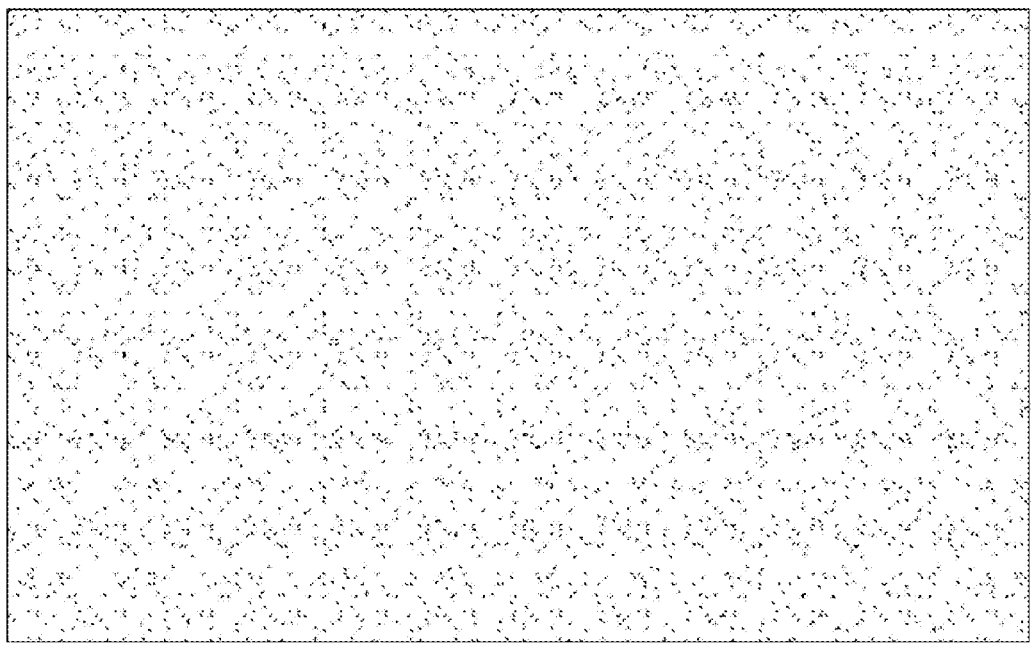
FIG. 2 is a diagram illustrating a pattern image generated by a pattern generation unit.

The pattern generation unit 101 generates a pattern image including a pattern serving as a reference (reference pattern image). The pattern includes a plurality of predetermined objects. FIG. 2 illustrates a pattern image generated by the pattern generation unit 101. The objects in the present embodiment are dots. The pattern image includes a large number of dots in a dispersed manner. In this pattern image, the dots are black, and the background is white. Alternatively, a pattern image in which the color is inverted, for example, the dots are white, and the background is black, may be used.

The color-based superposition unit 102 generates a pattern image to be projected by the projection apparatus 120 based on the reference pattern image. The color-based superposition unit 102 executes processing for shifting the positions of the dots in a predetermined direction and processing for changing the color of the shifted dots on the pattern image a plurality of times to thereby generate a plurality of pattern images (shift pattern images) in which the positions and the color of the dots differ. The color-based superposition unit 102 superposes a plurality of shift pattern images on the reference pattern image.

Figure 3D:
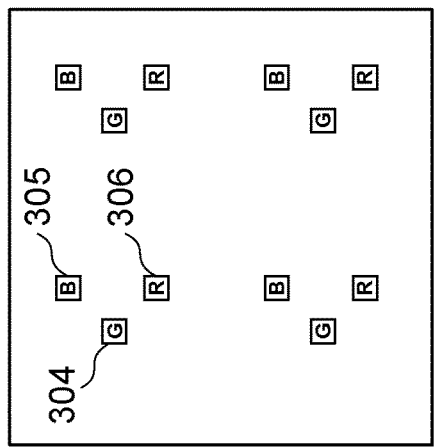
FIGS. 3A to 3D are diagrams illustrating processing that a color-based superposition unit executes.
Figure 3B:
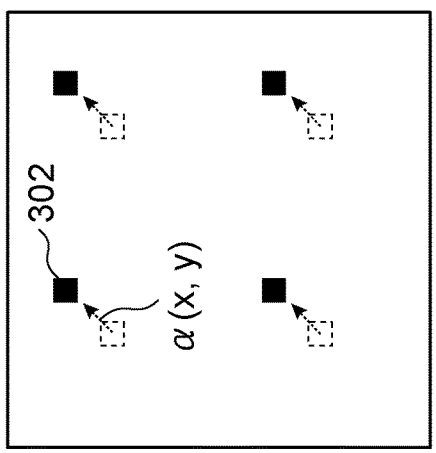
Figure 3C:
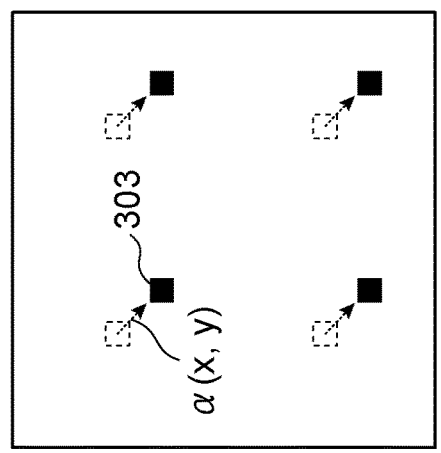
Figure 3A:
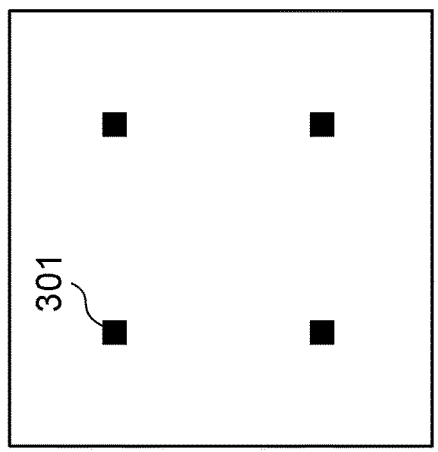

FIGS. 3A to 3D are diagrams illustrating the processing executed by the color-based superposition unit 102. FIG. 3A is an enlarged view of a partial rectangular area of the pattern image in FIG. 2. A dot contained in the reference pattern image is referred to as a reference dot 301. In the present embodiment, the reference dot 301 is shifted in two directions perpendicular to each other. In one example, the shifting directions are 45 degrees diagonally upper right (hereinafter simply referred to as "upper right") and 45 degrees diagonally lower right (hereinafter simply referred to as "lower right"). FIG. 3B illustrates part of an upper right shift pattern image obtained by shifting the dots in the pattern image to the upper right. The reference dot 301 is shifted to a dot 302. FIG. 3C illustrates part of a lower right shift pattern image obtained by shifting the dots in the pattern image to the lower right. The reference dot 301 is shifted to the position of a dot 303. The amount of shift of the reference dot 301 is expressed as α(x, y). Each dot contained in the reference pattern image is shifted by the shift amount of α(x, y). In other words, the reference dot 301 and the upper right dot 302 corresponding to the reference dot 301 is in a positional relationship in which the upper right dot 302 is 45 degrees upper right of the reference dot 301 and away therefrom by the shift amount of α(x, y). The reference dot 301 and the lower right dot corresponding to the reference dot 301 is in a positional relationship in which the lower right dot 303 is 45 degrees lower right of the reference dot 301 and away therefrom by the shift amount of α(x, y). The shifting directions are not limited to the two directions but may be one direction or three directions. Although the amount of shift to the upper right and the amount of shift to the lower right are the same in the present embodiment, the amounts may differ.

The color-based superposition unit 102 selects colors for the dots 301 in the reference pattern image, the dots 302 in the upper right shift pattern image, and the dots 303 in the lower right shift pattern image and changes the color of each dot to the selected color. In this case, the color-based superposition unit 102 selects green (G) as the color of the dots 301 in the reference pattern image, blue (B) as the color of the dots 302 in the upper right shift pattern image, and red (R) as the color of the dots 303 in the lower right shift pattern image. After changing the colors of the dots in the reference pattern image, the upper right shift pattern image, and the lower right shift pattern image, the color-based superposition unit 102 superposes the three pattern images with different dot colors. FIG. 3D is a pattern image to be projected obtained by superposing the three pattern images (hereinafter referred to as "projection pattern image"). In the projection pattern image, a dot 304 is obtained by changing the color of the reference dot 301 to green (G), a dot 305 is obtained by changing the color of the dot 302 shifted to the upper right to blue (B), and a dot 306 is obtained by changing the color of the dot 303 shifted to the lower right to red (R). As illustrated in FIG. 3D, the color-based superposition unit 102 generates a projection pattern image in which the reference dots and the shifted dots can be distinguished from each other and outputs the projection pattern image to the projection apparatus 120. The above processing is executed before alignment.

Figure 5A:
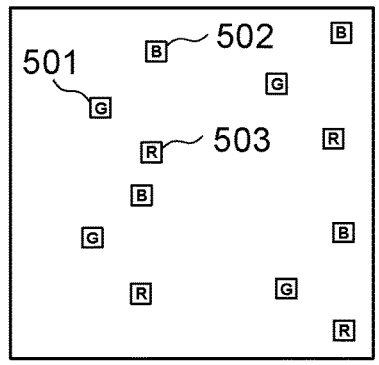
FIGS. 5A to 5E are diagrams illustrating processing that a transformation unit executes.
Figures 5B, 5C, 5D:
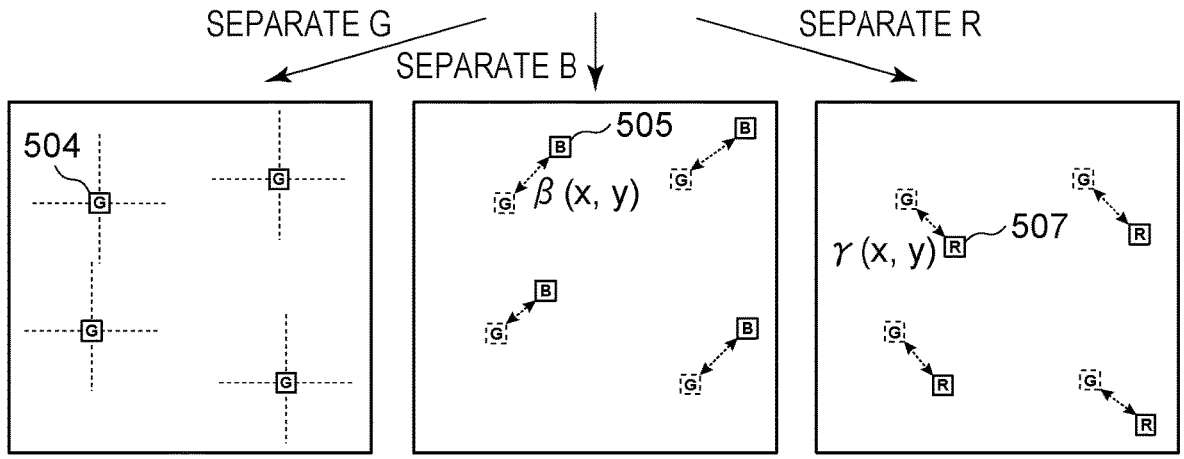

Next, a processing unit to be executed before alignment using the generated projection pattern image will be described. The color-based separation unit 103 obtains a captured image obtained by the image capturing apparatus 130 capturing an image of the projection plane on which the projection pattern image is projected and separates the captured image into color-by-color pattern images. First, the color-based separation unit 103 specifies an imaging projection area and clips a partial rectangular area of the imaging projection area. For example, the color-based separation unit 103 specifies the imaging projection area using the following method. First, the projection apparatus 120 projects a solid white image before projecting the projection pattern image. The image capturing apparatus 130 captures an image of the projection plane on which the solid white image is projected and binarizes the captured image using a threshold for separating the solid white image from the background area. The color-based separation unit 103 specifies the imaging projection area by detecting the outline of the binarized white area. Then, the color-based separation unit clips the imaging projection area from the captured image obtained by the image capturing apparatus 130 imaging the projection plane on which the projection pattern image is projected. FIG. 5A illustrates an image of the clipped rectangular area (hereinafter referred to as "rectangular image"). The clipped rectangular image contains a plurality of dots of different colors. Specifically, a dot 501 is green, a dot 502 is blue, and a dot 503 is red. In the projection pattern image, the reference dots are green, the dots obtained by shifting the reference dots to the upper right are blue, and the dots obtained by shifting the reference dots to the lower right are red, as described above. The captured image is obtained by capturing a projected image of the projection pattern image. This allows determining the dot 501 as a reference dot, the dot 502 as a dot shifted to the upper right, and the dot 503 as a dot shifted to the lower right in the clipped rectangular image. Accordingly, the color-based separation unit 103 separates the clipped rectangular image into individual color pattern images. FIG. 5B illustrates an image in which only green dots are extracted from the clipped rectangular image, in which a dot 504 is a reference dot. FIG. 5C illustrates an image in which only blue dots are extracted from the clipped rectangular image, in which a dot 505 corresponds to a dot obtained by shifting the reference dot to the upper right. FIG. 5D illustrates an image in which only red dots are extracted from the clipped rectangular image, in which a dot 507 corresponds to a dot obtained by shifting the reference dot to the lower right. As described above, the color-based separation unit 103 generates individual color pattern images from an area of the captured image corresponding to the projection area. In this case, three pattern images are generated. The pattern image containing G dots corresponds to a captured image of an image obtained by projecting the reference pattern image. The pattern image containing B dots corresponds to a captured image of an image obtained by projecting the upper right shift pattern image. The pattern image containing R dots corresponds to a captured image of an image obtained by projecting the lower right shift pattern image.

Furthermore, the color-based separation unit 103 derives the positional relationship among different dots in the captured image. Specifically, the color-based separation unit 103 calculates a shift amount indicating the distance between the reference dot and the upper right dot and a shift amount indicating the distance between the reference dot and the lower right dot. As illustrated in FIG. 5C, we let a vector $\beta(x, y)$ connecting the reference dot 504 and the dot 505 be the amount of shift from the reference dot 504 in the captured image. The color-based separation unit 103 calculate the shift amount $\beta(x, y)$ in the captured images by converting the rectangular images in FIG. 5B and FIG. 5C to frequency domains and by using a phase correlation shift method. As illustrated in FIG. 5D, we let a vector $\gamma(x, y)$ connecting the reference dot 504 and the dot 507 be the amount of shift from the reference dot 504 in the captured image. The color-based separation unit 103 calculates the shift amount $\gamma(x, y)$ in the captured image by converting the rectangular images in FIG. 5B and FIG. 5D to frequency domains and by using the phase correlation shift method. Although the method for calculating the shift amount on a frequency domain is illustrated, this is given for mere illustrative purposes. Another example is a block matching method for calculating the vector between two dots on an image.

The transformation unit 104 estimate the distortion of the projected image based on the shift amounts in the different directions in the pattern images output from the color-based superposition unit 102 and the shift amounts in the different directions in the captured images of the pattern images projected by the projection apparatus 120. The transformation unit 104 calculates the shift amount indicating the distance (positional relationship) between the reference dot and the upper right dot in the captured image and the amount of change in the distance (positional relationship) between the reference dot and the upper right dot in the captured image. Furthermore, the transformation unit 104 calculates the shift amount indicating the distance (positional relationship) between the reference dot and the lower right dot in the captured image and the amount of change in the distance (positional relationship) between the reference dot and the lower right dot in the captured image. The transformation unit 104 calculates transformation parameters for transforming the distortion of the projected image from the amounts of change. A specific method for estimating the distortion of the projected image will be described. First, the transformation unit 104 calculates the ratio of shift to the upper right, Scale1($x, y$), and the ratio of shift to the lower right, Scale2($x, y$), using Eqs. (1) and (2).

$$\text{Scale1}(x,y)=(\beta(x)/\alpha(x),\beta(y)/\alpha(y)) \qquad \text{Eq. (1)}$$

$$\text{Scale2}(x,y)=(\gamma(x)/\alpha(x),\gamma(y)/\alpha(y)) \qquad \text{Eq. (2)}$$

where $\alpha$ is a shift amount in the projection pattern image and $\beta$ and $\gamma$ are shift amounts in the captured image.

Figure 6A:
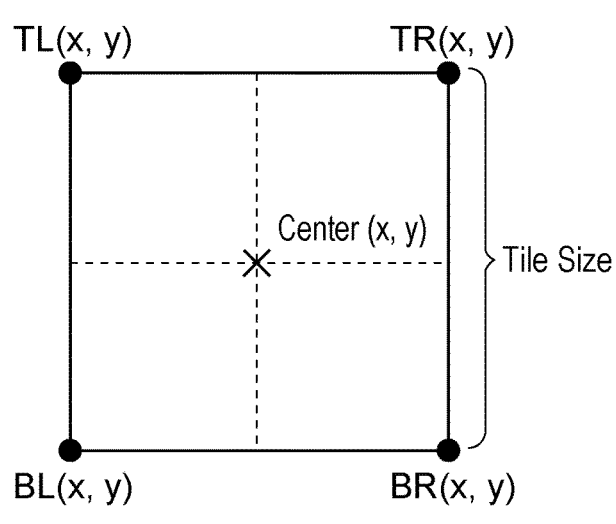
FIGS. 6A and 6B are diagrams illustrating transformation of an image.

As illustrated in FIG. 6A, the transformation unit 104 calculates the coordinate values TL (Top Left), BR (Bottom Right), TR (Top Right), and BL (Bottom Left) of the four vertexes of a rectangular area, illustrated in FIG. 6A, clipped by the color-based separation unit 103 using Eqs. (3) to (6):

$$TL(x,y)=(\text{Center}(x)-\text{Patch\_Size}/2,\text{Center}(y)-\text{Patch\_Size}/2) \qquad \text{Eq. (3)}$$

$$BR(x,y)=(Center(x)+Patch\_Size/2, Center(y)+Patch\_Size/2) \quad \text{Eq. (4)}$$

$$TR(x,y)=(Center(x)+Patch\_Size/2, Center(y)-Patch\_Size/2) \quad \text{Eq. (5)}$$

$$BL(x,y)=(Center(x)-Patch\_Size/2, Center(y)+Patch\_Size/2) \quad \text{Eq. (6)}$$

where Center(x, y) is the central coordinates of the rectangular area, and Patch_Size is the length of each side.

Figure 6B:
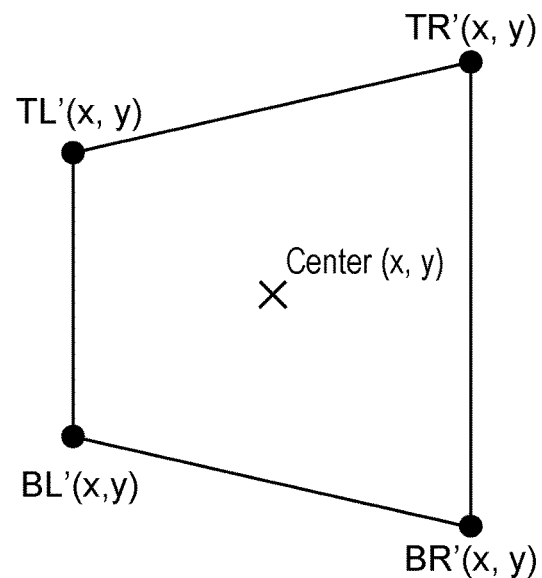

The clipped rectangular area is distorted due to the influence of the positional relationship between the projection apparatus 120 and the projection plane and the positional relationship between the image capturing apparatus and the projection plane. Therefore, the shift amounts in the rectangular area clipped from the imaging projection area are β and γ, although the original shift amount of the pattern image is α. Thus, transforming the rectangular area clipped so that the shift amount α becomes the shift amounts β and γ forms an image of the shape as illustrated in FIG. 6B. The image obtained by the transformation is referred to as "distorted image". The transformation unit 104 calculates the coordinate values TL', BR', TR', and BL' of the four vertexes of the distorted image illustrated in FIG. 6B using Eqs. (7) to (10) based on the ratios of the shift amounts calculated using Eqs. (1) and (2) and the coordinate values TL, BR, TR, and BL of the four vertexes calculated using Eqs. (3) to (6).

$$TL'(x,y)=(Center(x)-Patch\_Size/2\times Scale2(x), Center(y)-Patch\_Size/2\times Scale2(y)) \quad \text{Eq. (7)}$$

$$BR'(x,y)=(Center(x)+Patch\_Size/2\times Scale2(x), Center(y)+Patch\_Size/2\times Scale2(y)) \quad \text{Eq. (8)}$$

$$TR'(x,y)=(Center(x)+Patch\_Size/2\times Scale1(x), Center(y)-Patch\_Size/2\times Scale1(y)) \quad \text{Eq. (9)}$$

$$BL'(x,y)=(Center(x)-Patch\_Size/2\times Scale1(x), Center(y)+Patch\_Size/2\times Scale1(y)) \quad \text{Eq. (10)}$$

Figure 5E:
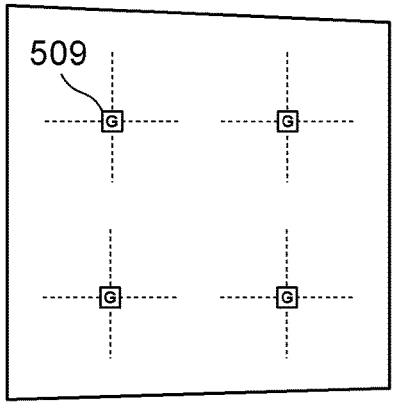

The transformation unit 104 estimates a homography based on the rectangular image and the distorted image. The transformation unit 104 generates a rectangular image in which the distortion of the captured image is transformed by executing projective transformation using inverse transformation of the estimated homography. FIG. 5E is an image in which the distortion of the captured image of the reference pattern image illustrated in FIG. 5B is transformed. Although the image in FIG. 5E is distorted in outer shape because it is the result of transforming a partial rectangular patch of the imaging projection area, the imaging projection area becomes rectangular due to the transformation.

Figure 7B:
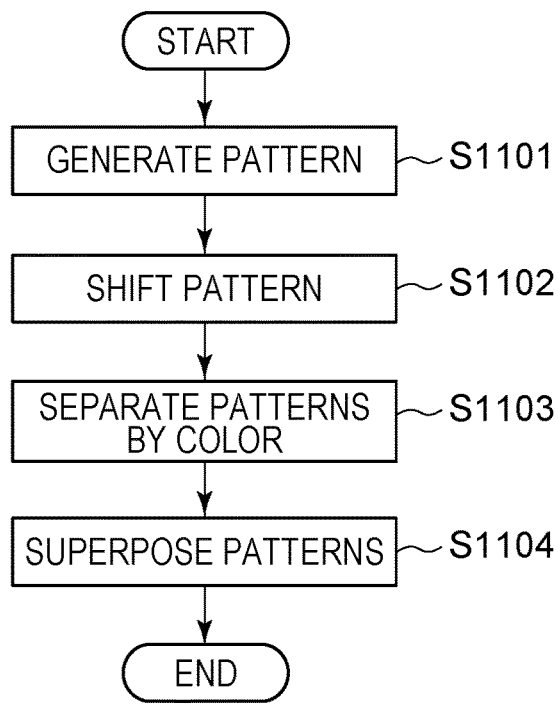

FIG. 7B is a detailed flowchart for the projection-pattern-image generation processing that the image processing apparatus 100 executes at S1001 in FIG. 7A. The configurations (functions) are implemented by a CPU (not illustrated) reading and executing a program for implementing the flowchart in FIG. 7B.

At S1101, the pattern generation unit 101 generates a reference pattern image. At S1102, the color-based superposition unit 102 generates a pattern image in which the positions of the objects (dots) in the reference pattern image are shifted to the upper right and a pattern image in which the positions of the objects (dots) in the reference pattern image are shifted to the lower right. At S1103, the color-based superposition unit 102 changes the color of the dots in each pattern image. At S1104, the color-based superposition unit 102 superposes the pattern images to generate a projection pattern image.

Figure 7C:
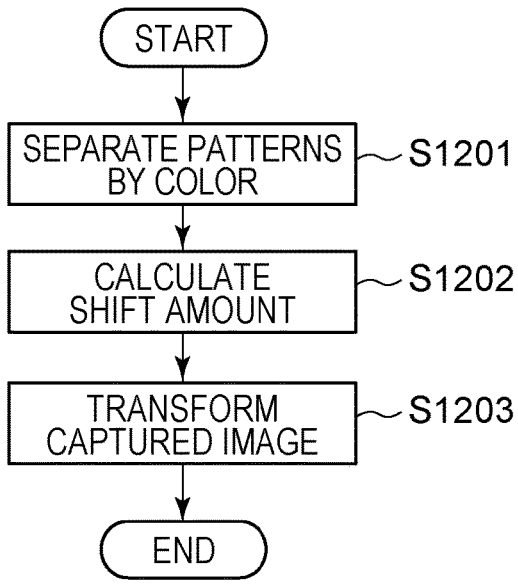

FIG. 7C is a flowchart for the transformation processing that the image processing apparatus 100 executes at S1004 in FIG. 7A. The configurations (functions) are implemented by the CPU (not illustrated) reading and executing a program for implementing the flowchart illustrated in FIG. 7C. At S1201, the color-based separation unit 103 separates the captured image into color-by color pattern images. At S1202, the color-based separation unit 103 calculates the amount of shift between the dots in the captured image of the projected reference pattern and the dots in the captured image of each projected shift pattern image. At S1203, the transformation unit 104 corrects the distortion of the captured image from the ratio of the shift amounts in the projection pattern images (the shift amount used at S1202 in FIG. 7B) to the shift amounts calculated at S1102.

Thus, in the present embodiment, the distortion of the captured image of an image projected by the projection apparatus is detected using a pattern image in which reference objects, objects obtained by shifting the reference objects to a first position, and objects obtained by shifting the reference objects to a second direction are superposed in different colors.

If the individual objects cannot be distinguished, for example, it is necessary to capture an image obtained by projecting the reference pattern image with the projection apparatus 120 and then capture an image obtained by projecting the shift pattern image in which the objects are shifted with the projection apparatus 120. Shifting the objects in two different directions as in the present embodiment requires a total of three times of projection and image capturing. In the present embodiment, however, superposing the objects in different colors allows distinguishing the reference objects, the objects shifted in the first position, and the objects shifted in the second direction in the captured image obtained by capturing the image projected by the projection apparatus 120. This reduces the number of times of image capturing for alignment.

Furthermore, superposing the pattern images shifted in different directions and the reference pattern image to form a single projection pattern image, as in the present embodiment, needs only one time of projection and image capturing. For this reason, even if misalignment occurs in the positional relationship among the installed devices due to, for example, screen shaking, during the multiple times of projection and image capturing, the amount of shift between the objects can be accurately calculated, allowing high-accuracy transformation of the captured image.

Second Embodiment

In the first embodiment, the captured image is separated by color without change. In a second embodiment, a technique for assisting detection of objects in the captured image by multiplying the image by a gain on a saturation axis in analyzing an image obtained by capturing a projected image will be described. In the present embodiment, the same components as those of the first embodiment are given the same reference signs and detailed descriptions thereof will be omitted.

FIG. 8 is a block diagram illustrating, in outline, an image processing system and the logical configuration of an image processing apparatus of the second embodiment. The image processing apparatus 100 further includes a background subtracting unit 110 and a color enhancing unit 111.

In the first embodiment, a projection pattern image in which pattern images with different dot colors are superposed is projected and the projected image is captured. The pixel values of pixels corresponding to the dots in the captured image differ for each color. In general, the values of red and blue pixels are smaller than the value of green pixels. For this reason, the red dots and blue dots may have insufficient contrast in the captured image. Accordingly, in the present embodiment, the difference between the captured image of an image obtained by projecting a projection pattern image and the captured image of an image obtained by projecting a solid black image in which all the pixels are black (hereinafter referred to as "solid black image) is calculated. By further applying a gain to the difference image by color, the contrast among the color dots in the captured image is enhanced.

Figure 9A:
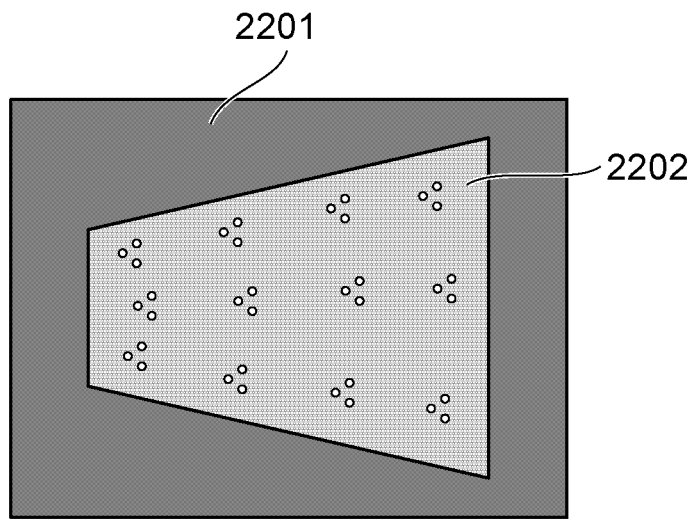
FIGS. 9A to 9C are diagrams illustrating, in outline, processing that a background subtracting unit executes.
Figure 9B:
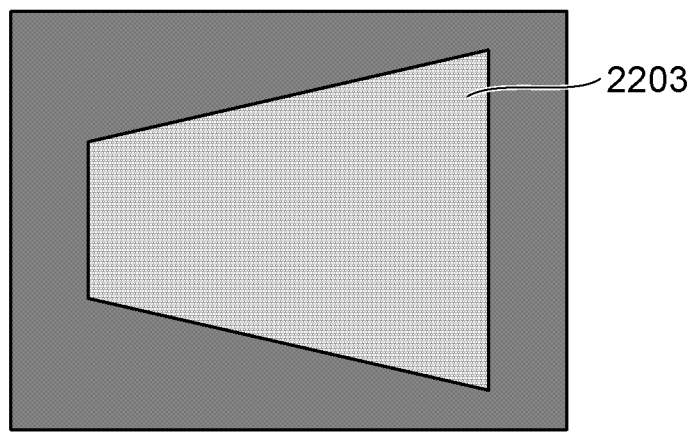
Figure 9C:
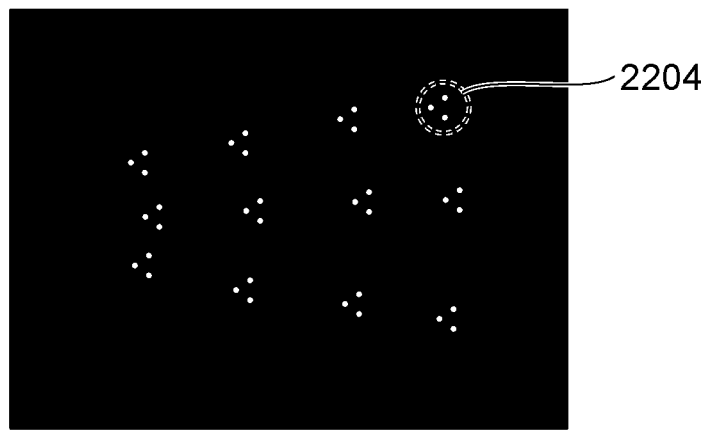

The processing for calculating the difference between the projection pattern image and the solid black image will be described with reference to FIGS. 9A to 9C. First, the projection pattern image is projected on a projection plane and then the projected pattern image is captured. FIG. 9A illustrates a captured image of the image obtained by projecting the projection pattern image. An area 2202 in a projection plane 2201 is an area in which the projection pattern image is projected. Next, the projection apparatus 120 projects a solid black image on the projection plane 2201, and the image capturing apparatus 130 captures the projected solid black image. FIG. 9B illustrates a captured image of the projected solid black image. An area 2203 is an area in which the solid black image is projected.

The background subtracting unit 110 generates a difference image by subtracting the pixel value of each pixel in the captured image illustrated in FIG. 9B from the pixel value of each pixel in the captured image illustrated in FIG. 9A. FIG. 9C illustrates the difference image. Thus, only dots 2204 of the projection pattern remain in the difference image by subtracting the captured image of the projected solid black image from the captured image of the image obtained by projecting the projection pattern image.

Figure 10A:
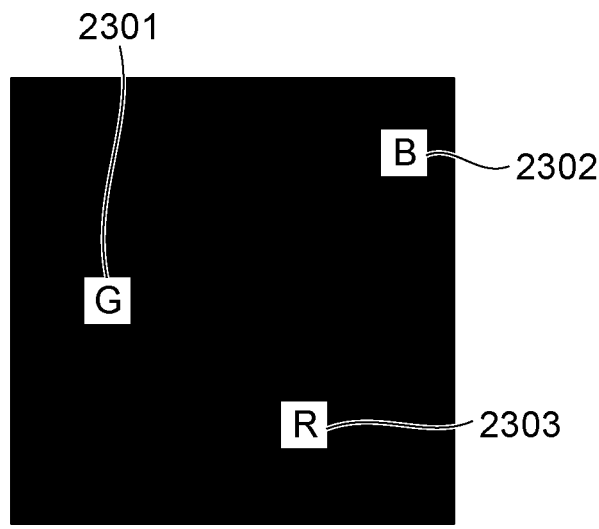
FIGS. 10A to 10C are diagrams illustrating, in outline, processing that a color enhancing unit executes.
Figure 10B:
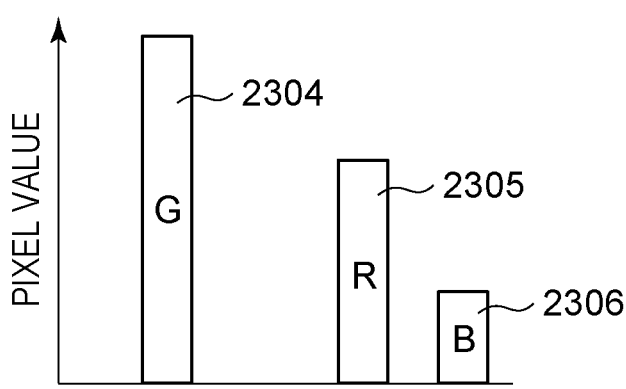
Figure 10C:
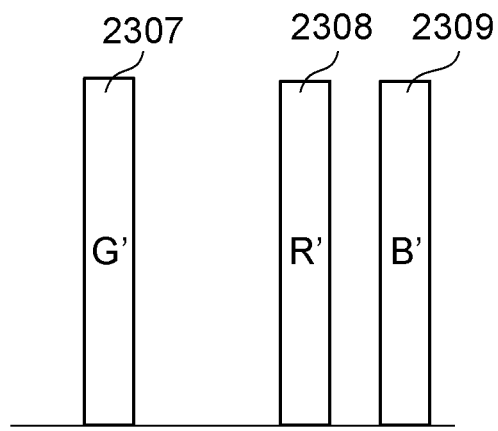

The color enhancement processing for correcting the color of the captured image using a gain will be described with reference to FIGS. 10A to 10C. FIG. 10A illustrates an enlarged image of part of the difference image generated by the background subtracting unit 110. A dot 2301 is a green dot, a dot 2302 is a blue dot, and a dot 2303 is a red dot. FIG. 10B is a graph illustrating the pixel values of pixels corresponding to the individual dots in FIG. 10A. The vertical axis indicates pixel values, and the horizontal axis indicates X-coordinate values. A pixel value 2304 corresponds to the green dot 2301, a pixel value 2305 corresponds to the red dot 2303, and a pixel value 2306 corresponds to the blue dot 2302. FIG. 10C is a graph illustrating pixel values after the pixel values in FIG. 10B are multiplied by a gain to enhance the contrast. Since the original pixel values of the red and blue dots are smaller than the original pixel value of the green dot, the colors are enhanced by using different gains so as to have the same value. A pixel value 2307 is the pixel value of a green (G') dot obtained by multiplying the pixel value 2304 corresponding to the green dot 2301 by a gain. A pixel value 2308 is the pixel value of a red (R') dot obtained by multiplying the pixel value 2305 corresponding to the red dot 2303 by a gain. A pixel value 2309 is the pixel value of a blue (B') dot obtained by multiplying the pixel value 2306 corresponding to the blue dot 2302 by a gain. In the present embodiment, in order to improve the contrast among the dots, the color enhancing unit 111 performs color enhancement processing so that the color of each dot is enhanced on the saturation axis. This is because, if the environment light is white, the use of the saturation axis facilitates providing higher contrast.

First, the color enhancing unit 111 converts the pixel values corresponding to the dots in the difference image to values Y, Cb, and Cr according to ITU-BT.601 as expressed as Eqs. (11) to (13). The conversion standard is however not limited to the above.

$$Y = 0.299 \times R + 0.587 \times G + 0.114 \times B \qquad \text{Eq. (11)}$$

$$Cb = -0.168736 \times R - 0.331264 \times G + 0.5 \times B \qquad \text{Eq. (12)}$$

$$Cr = 0.5 \times R - 0.418688 \times G - 0.081312 \times B \qquad \text{Eq. (13)}$$

Next, the color enhancing unit 111 calculates the maximum saturation values Mb and Mr of the absolute values of Cb and Cr using Eq. (14) and Eq. (15).

$$Mb = \max(|Cb|) \qquad \text{Eq. (14)}$$

$$Mr = \max(|Cr|) \qquad \text{Eq. (15)}$$

Next, the color enhancing unit 111 respectively multiplies Cb and Cr by values corresponding to the reciprocal of the maximum saturation values Mb and Mr as a gain, as expressed as Eq. (16) and Eq. (17). The numerator 0.5 of the gains in Eq. (16) and Eq. (17) is the maximum value of the range of the saturation values.

$$Cb = Cb \times 0.5 / Mb \qquad \text{Eq. (16)}$$

$$Cr = Cr \times 0.5 / Mr \qquad \text{Eq. (17)}$$

If outside light, such as sun light or illumination light, is incident on part of the projection plane, the saturation value of the area where the outside light is incident becomes low. If the saturation value of some part is low, the determination of the gain based on the maximum saturation value decreases the gain of the area where the outside light is incident, resulting in an insufficient gain for the area that needs an increased gain. To prevent this insufficient gain, the gain may be applied based on a value that is slightly smaller than the maximum saturation value.

Next, the color enhancing unit 111 converts the values Y, Cb, and Cr to values R, G, and B according to ITU-BT.601 to obtain values R', G', and B' in which the saturation is increased.

$$R' = Y + 1.402 \times Cr \qquad \text{Eq. (8)}$$

$$G' = Y - 0.344136 \times Cb - 0.714136 \times Cr \qquad \text{Eq. (9)}$$

$$B' = Y + 1.772 \times Cb \qquad \text{Eq. (10)}$$

The color-based separation unit 103 separates the captured image in which the contrast is enhanced into patterns by color, and the transformation unit 104 transforms the captured image and outputs the transformed image.

Figure 11A:
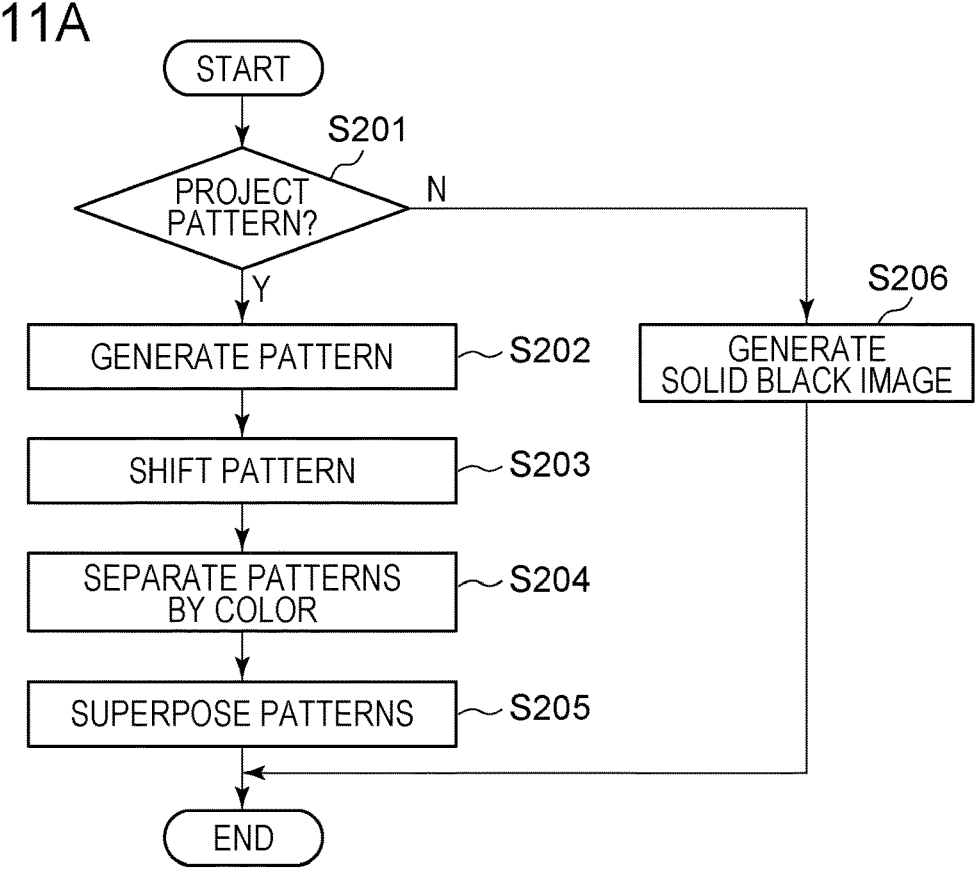
FIGS. 11A and 11B are flowcharts of the image processing system of the second embodiment.

The above processing procedure will be described in outline, with reference to the flowcharts in FIGS. 11A and 11B. The processing procedure of the overall control method is the same as the processing procedure in FIG. 7A. FIG. 11A is a detailed flowchart for the superposed-pattern generation processing at S1001 in FIG. 7A. At S201, the image processing apparatus 100 receives an instruction for selection whether to project a pattern image or a solid black image from the user. If projection of a pattern image is selected, the process proceeds to S202. If projection of a solid black image is selected, the process proceeds to S206, at which the pattern generation unit 101 generates a solid black image. At S202, the pattern generation unit 101 generates a reference pattern image containing dots. At S203, the color-based superposition unit 102 shifts the dots in the reference pattern image to the upper right or the lower right. At S204, the color-based superposition unit 102 changes the colors of the dots in the reference pattern image, the upper right shift pattern image, and the lower right shift pattern image. At S205, the color-based superposition unit 102 superposes the reference pattern image, the upper right shift pattern image, and the lower right shift pattern image with different dot colors.

Figure 11B:
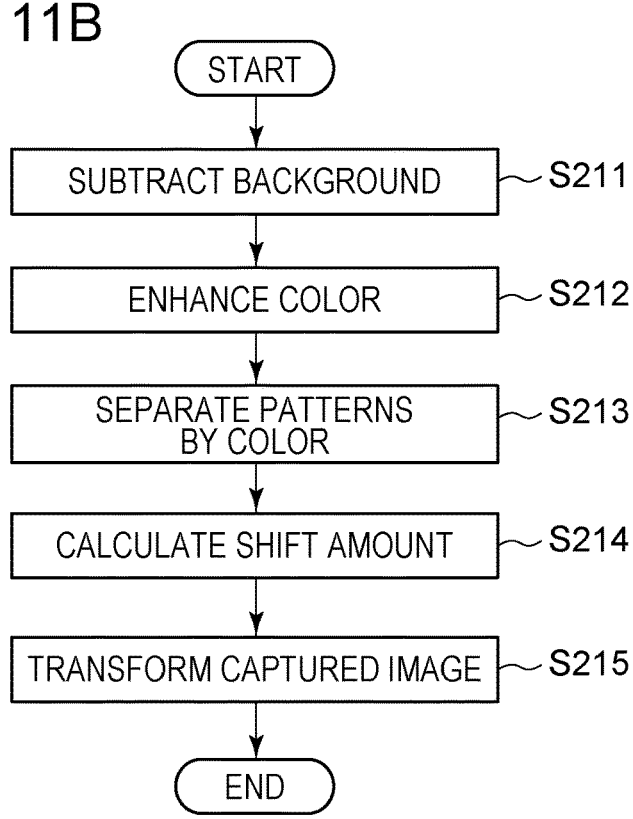

FIG. 11B is a detailed flowchart for the transformation at S1004 in FIG. 7A. At S211, the background subtracting unit 110 subtracts an image captured from a projected solid black image from an image captured from an image obtained by projecting a pattern image. At S212, the color enhancing unit 111 enhances the color of the dots in the captured image of the projected pattern image based on the difference image. At S213, the color-based separation unit 103 separates dot pattern images by color from the captured image. At S214, the color-based separation unit 103 calculates the amount of shift between the dots. At S215, the transformation unit 104 corrects the distortion of the captured image from the shift amount between the dots.

Thus, the present embodiment improves the accuracy of correction of the transformation unit by enhancing the contrast by taking the difference between the captured image of the superposed pattern image and the captured image of the solid black image and applying a gain to the color of the captured image.

Third Embodiment

In the above embodiments, pattern images in which the colors of the shifted objects are changed are superposed to form a single pattern image. In a third embodiment, a technique for changing the shapes of the shifted objects and superposing the pattern images to form a single pattern image will be described.

Figure 12:
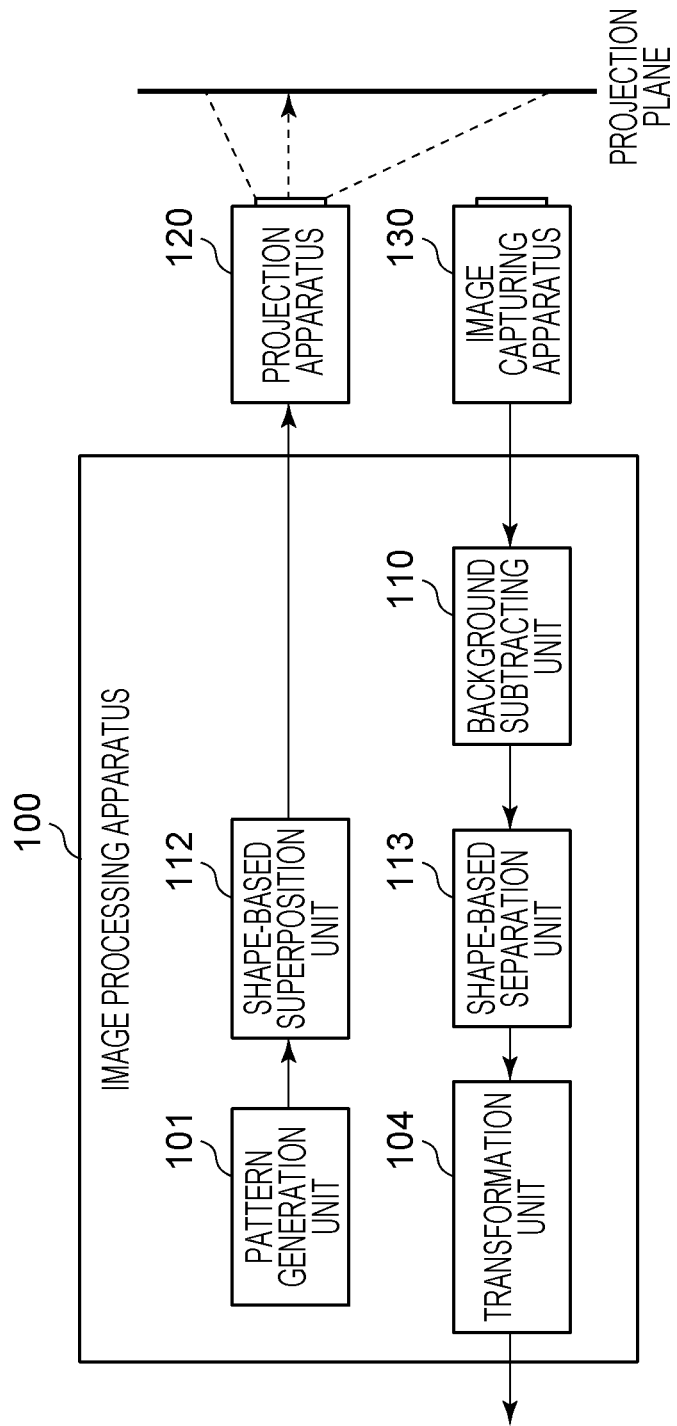
FIG. 12 is a block diagram illustrating, in outline, an image processing system and the logical configuration of an image processing apparatus according to one or more aspects of the present disclosure.

FIG. 12 illustrates an example of the functional configuration of an image processing system according to a third embodiment of the present disclosure. Reference numeral 110 denotes a background subtracting unit, 112 denotes a shape-based superposition unit, and 113 denotes a shape-based separation unit. The other configuration is the same as the configuration of the first embodiment.

In the first and second embodiments, patterns in which the colors of the objects are changed are superposed for projection and imaging. The R, G, and B patterns are, however, lower in brightness than a white pattern.

In the present embodiment, the patterns in which the shapes of the objects are changed are superposed so as to be projected and imaged without decreasing in brightness, and the objects are separated by shape to correct the distortion.

A sequence of processing for changing the shape and superposing and separating the patterns will be described with reference to FIG. 13 and FIGS. 14A to 14E.

First, the pattern generation unit 101 generates a pattern containing dots each formed of one pixel. Although the dots are black, and the background is white, the colors may be inverted, that is, the dots may be white, and the background may be black.

Next, the shape-based superposition unit 112 performs processing for shifting the positions of the dots in the pattern and processing for changing the shapes of the dots and superposing the patterns. The shifting process is the same as the process in the first embodiment.

Figure 13:
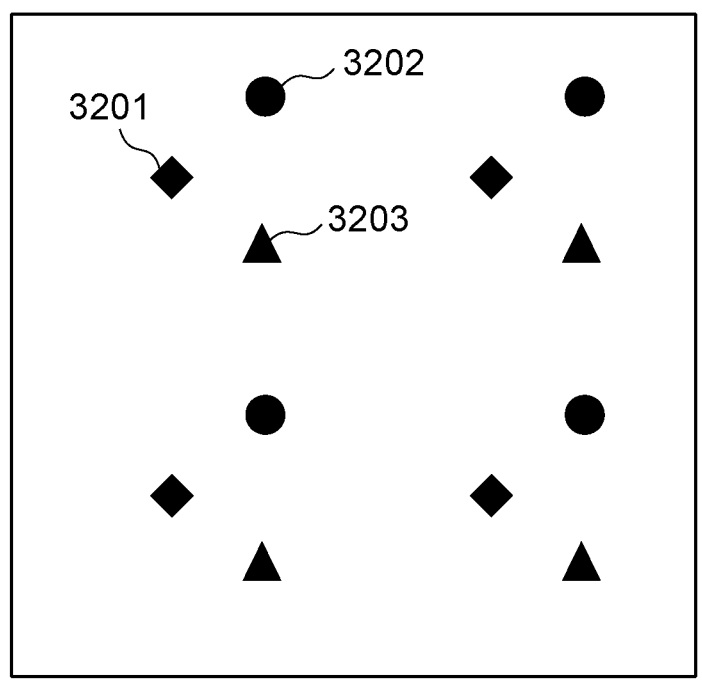
FIG. 13 is a diagram illustrating, in outline, processing that a shape-based superposition unit executes.

FIG. 13 illustrates a pattern in which the shapes of the shifted dots are changed. In comparison with the dots whose colors are changed in the first embodiment of FIG. 3D, a dot 3201 in FIG. 13 is changed in shape to a lozenge instead of G, a dot 3202 is changed in shape to a round instead of B, and a dot 3203 is changed in shape to a triangle instead of R. The objects may have any size that allows distinguishing the shape. An example method for changing the shape is storing objects of the above shapes in a memory and replacing the dots with the objects.

The projection apparatus 120 alternately projects the superposed pattern and a solid black image on a projection plane, the image capturing apparatus 130 captures the projected image, and the background subtracting unit 110 subtracts the solid black image from the pattern image.

Figure 14A:
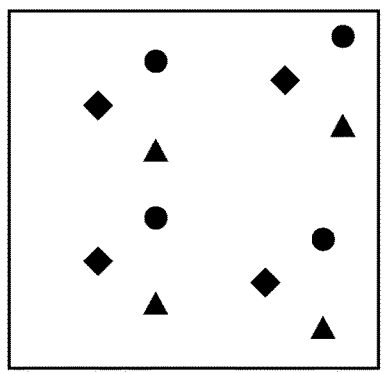
FIGS. 14A to 14E are diagrams illustrating, in outline, processing that a shape-based separation unit executes.
Figure 14B:
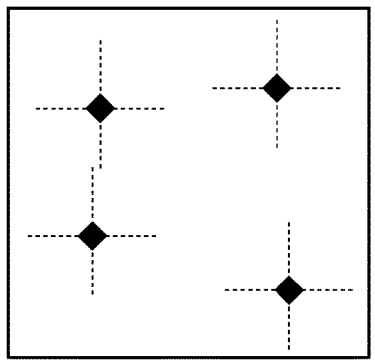
Figure 14C:
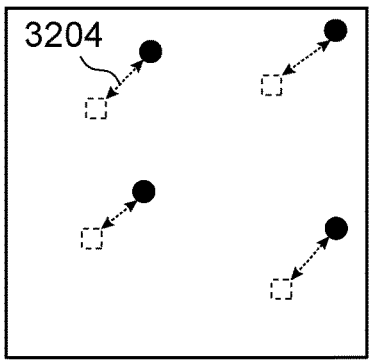
Figure 14D:
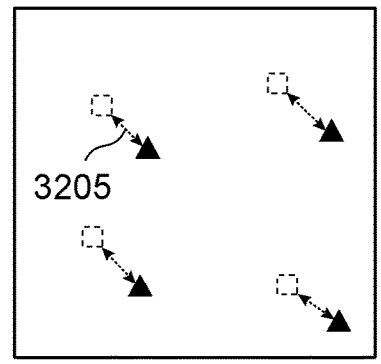

Next, the shape-based separation unit 113 separates patterns containing the objects by shape from the subtracted image. FIG. 14A illustrates part of the pattern image subtracted by the background subtracting unit 110, the pattern image being to be input to the shape-based separation unit 113. FIG. 14B illustrates a pattern image in which the lozenges are separated from FIG. 14A. FIG. 14C illustrates a pattern image in which the rounds are separated from FIG. 14A, in which reference numeral 3204 denotes the amount of shift to the upper right. FIG. 14D illustrates a pattern image in which the triangles are separated from FIG. 14A, in which reference numeral 3205 denotes the amount of shift to the lower right. The shift amount is calculated by determining the center of gravity of the object and then using the center of gravity, as in the first embodiment.

Figure 14E:
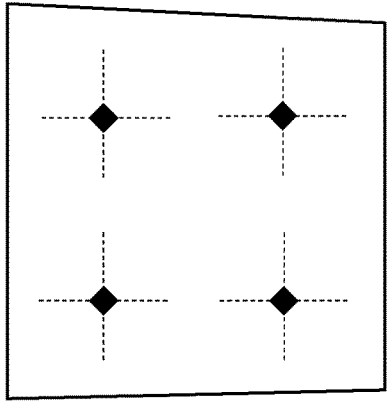

Lastly, the transformation unit 104 corrects the distortion of the captured image using the ratio of the amount of shift performed by the shape-based superposition unit 112 to the shift amount calculated by the shape-based separation unit 113. FIG. 14E illustrates a pattern image in which the distortion in FIG. 14B is corrected.

Figure 15A:
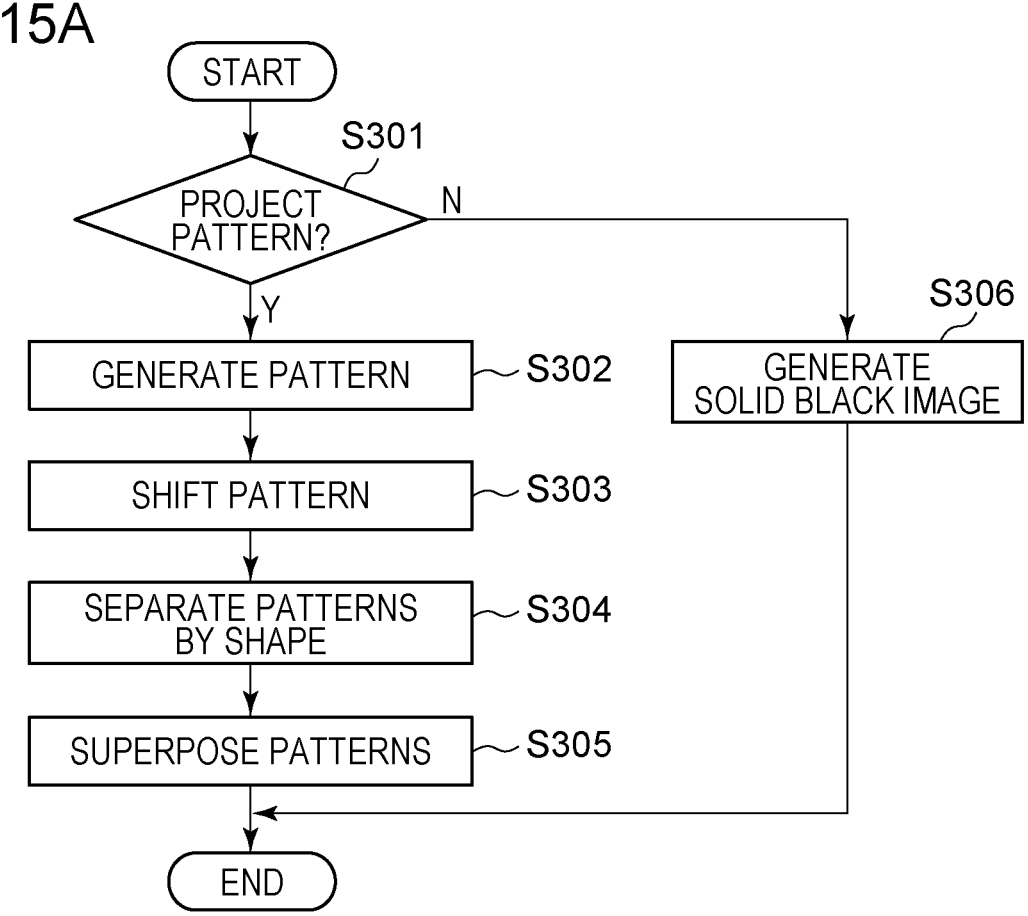
FIG. 15A is a flowchart on the projection side.

The above processing procedure will be described, in outline, with reference to flowcharts in FIGS. 15A and 15B. The processing procedure of the overall control method is the same as the processing procedure in FIG. 7A. FIG. 15A is a detailed flowchart for the superposed-pattern image generation processing at S1001 in FIG. 7A. At S301, the user selects whether to project a pattern image or a solid black image. If projection of a pattern image is selected, the process proceeds to S302. If projection of a solid black image is selected, then the process proceeds to S306 to generate a solid black image. At S302, the pattern generation unit 101 generates a pattern image containing objects. At S303, the shape-based superposition unit 112 shifts the objects to the upper right or the lower right. At S304, the shape-based superposition unit 112 changes the shapes of the objects. At S305, the shape-based superposition unit 112 superposes pattern images containing objects of different shapes.

Figure 15B:
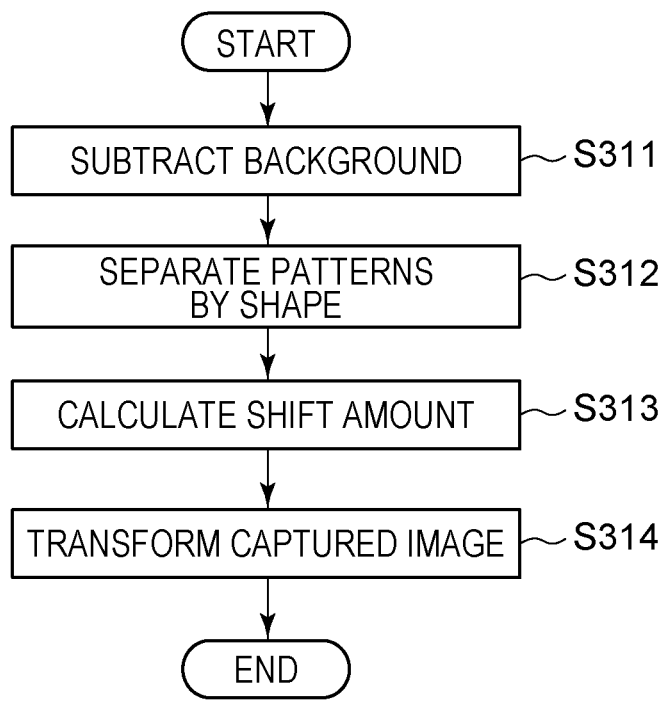
FIG. 15B is a flowchart on the image capturing side.

FIG. 15B is a detailed flowchart for the transformation at S1004 in FIG. 7A.

At S311, the background subtracting unit 110 subtracts the solid black image from the captured pattern image. At S312, the shape-based separation unit 113 separates pattern images by shape from the captured image. At S313, the shape-based separation unit 113 obtains the amount of shift between the objects. At S314, the transformation unit 104 corrects the distortion of the captured image from the amount of shift between the objects.

Thus, the present embodiment provides higher contrast by separating the colors of the objects even if sufficient light is not reflected from the projection plane, preventing a decrease in the accuracy of transformation.

Fourth Embodiment

In the first embodiment, pattern images in which the colors of the shifted objects are changed are superposed to form a single pattern image. In the third embodiment, pattern images in which the shapes of the shifted objects are changed are superposed to form a single pattern image. In a fourth embodiment, a technique for changing the colors of the shapes of the shifted objects and superposing the pattern images to form a single pattern image will be described.

Figure 16:
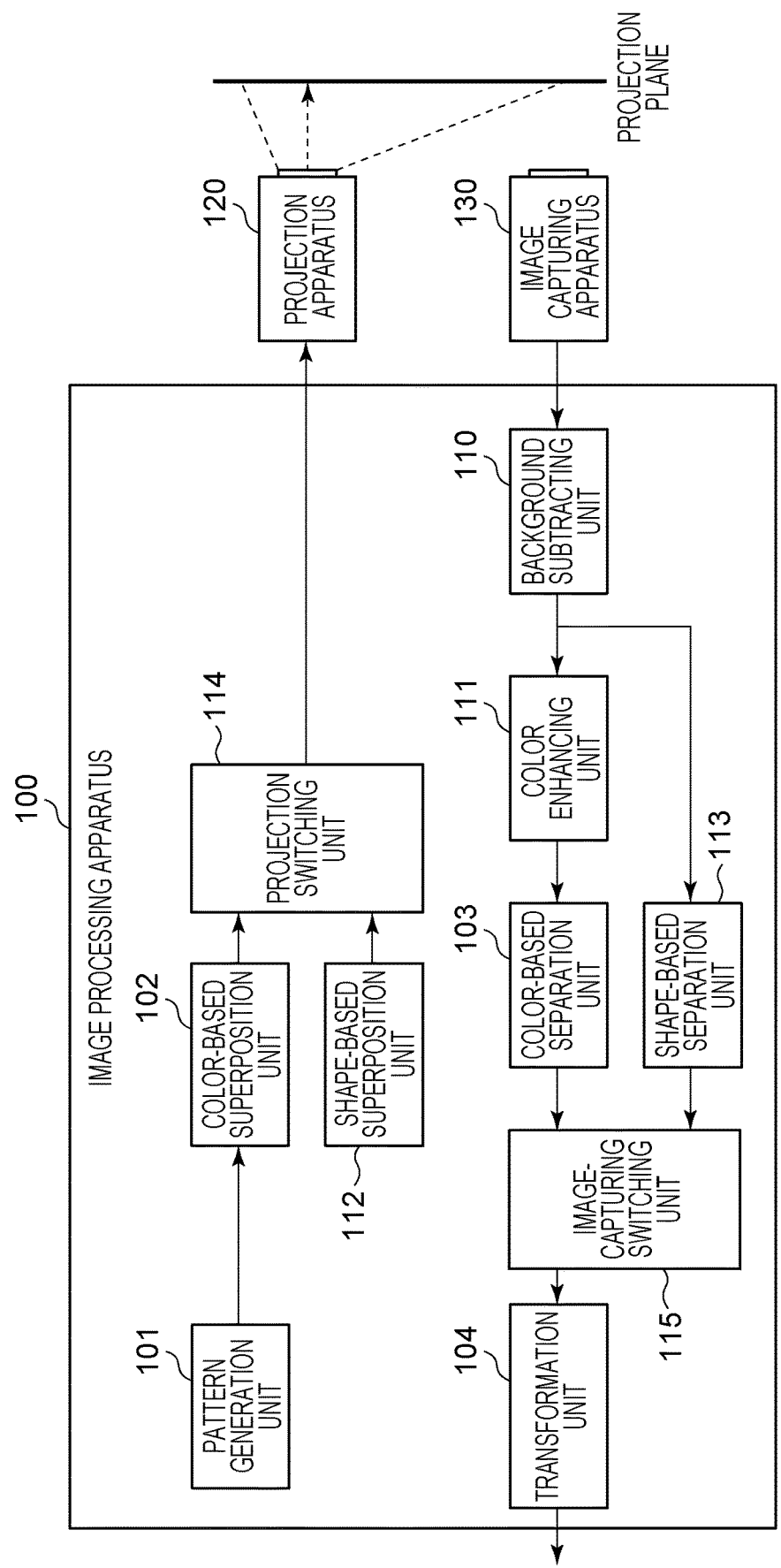
FIG. 16 is a block diagram illustrating, in outline, an image processing system and the logical configuration of an image processing apparatus according to one or more aspects of the present disclosure.

FIG. 16 illustrates an example of the functional configuration of an image processing system according to a fourth embodiment of the present disclosure. Reference numeral 112 denotes a shape-based superposition unit, 113 denotes a shape-based separation unit, 114 denotes a projection switching unit, and 115 denotes an image-capturing switching unit. The other configuration is the same as the configuration of the first embodiment.

In the third embodiment, patterns in which the shapes of the objects are changed are superposed for projection and image capturing. However, shape recognition of the objects requires that the objects have a certain size. For this reason, if the surface of the projection plane has minute irregularities, such as roughness, an error occurs in separation by shape and calculation of the center of gravity, resulting in a decrease in the accuracy of correction performed by the transformation unit.

Accordingly, by changing the color or shape of the objects depending on the color or the state of the surface of the projection plane, optimum objects are projected on the projection plane. A sequence of processes will be described with reference to FIG. 16 and FIGS. 17A and 17B. First, selection of whether to separate pattern images by color or by shape is performed. For example, the user selects higher-accuracy separation from the correction result of the transformation unit 104.

Figure 17A:
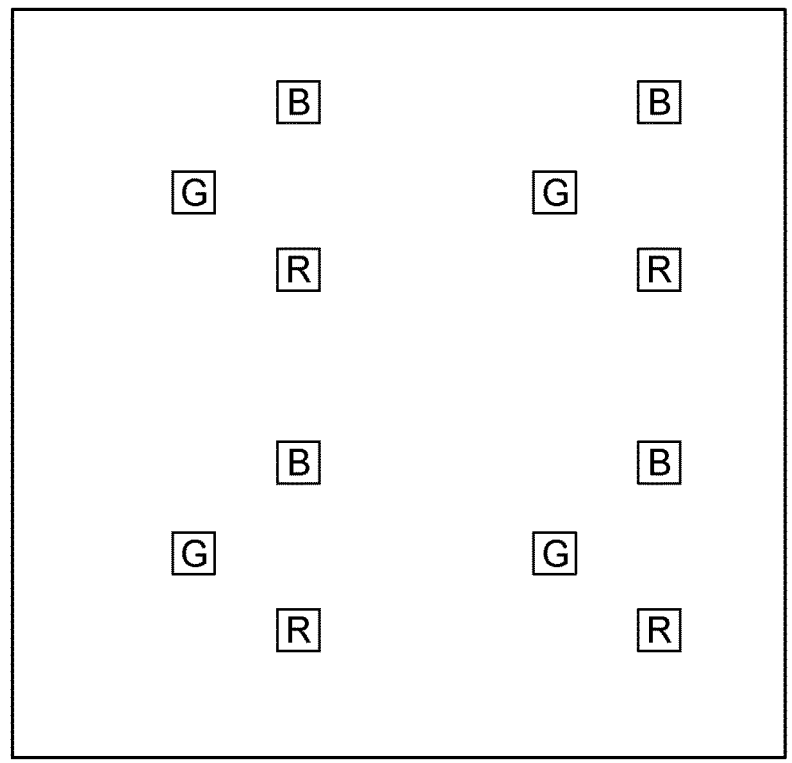
FIG. 17A is a diagram illustrating, in outline, processing that a color-based superposition unit executes.
Figure 17B:
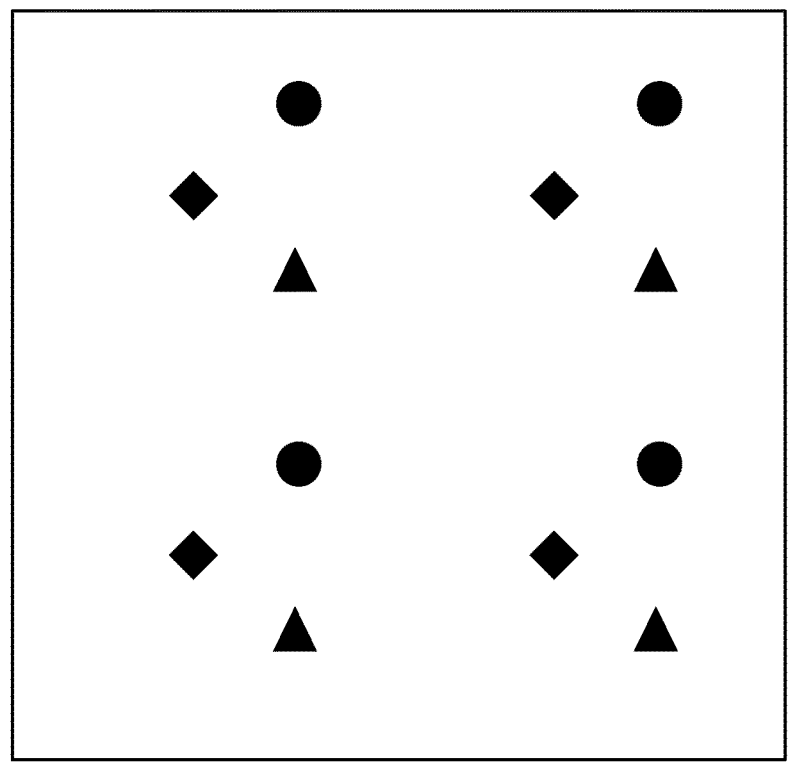
FIG. 17B is a diagram illustrating, in outline, processing that a shape-based superposition unit executes.

Next, a color-based pattern or a shape-based pattern is selected based on the selection result. FIG. 17A illustrates a pattern superposed by color, and FIG. 17B illustrates a pattern superposed by shape. The projection switching unit 114 selects either of the two patterns and outputs the selected pattern. In the present embodiment, two patterns, by color and by shape, are generated in advance. Alternatively, only a pattern according to the selection result may be generated.

The projection apparatus 120 alternately projects the selected pattern and the solid black image on the projection plane. The image capturing apparatus 130 captures the projected image, and the background subtracting unit 110 subtracts the solid black image from the pattern image. Next, the pattern separated from the subtracted pattern image is switched between separation by color or separation by shape.

Lastly, the transformation unit 104 corrects the distortion of the captured image from the difference between the amount of shift performed by the color-based superposition unit 102 or the shape-based superposition unit 112 and the shift amount calculated by the color-based separation unit 103 or the shape-based separation unit 113.

Figure 18A:
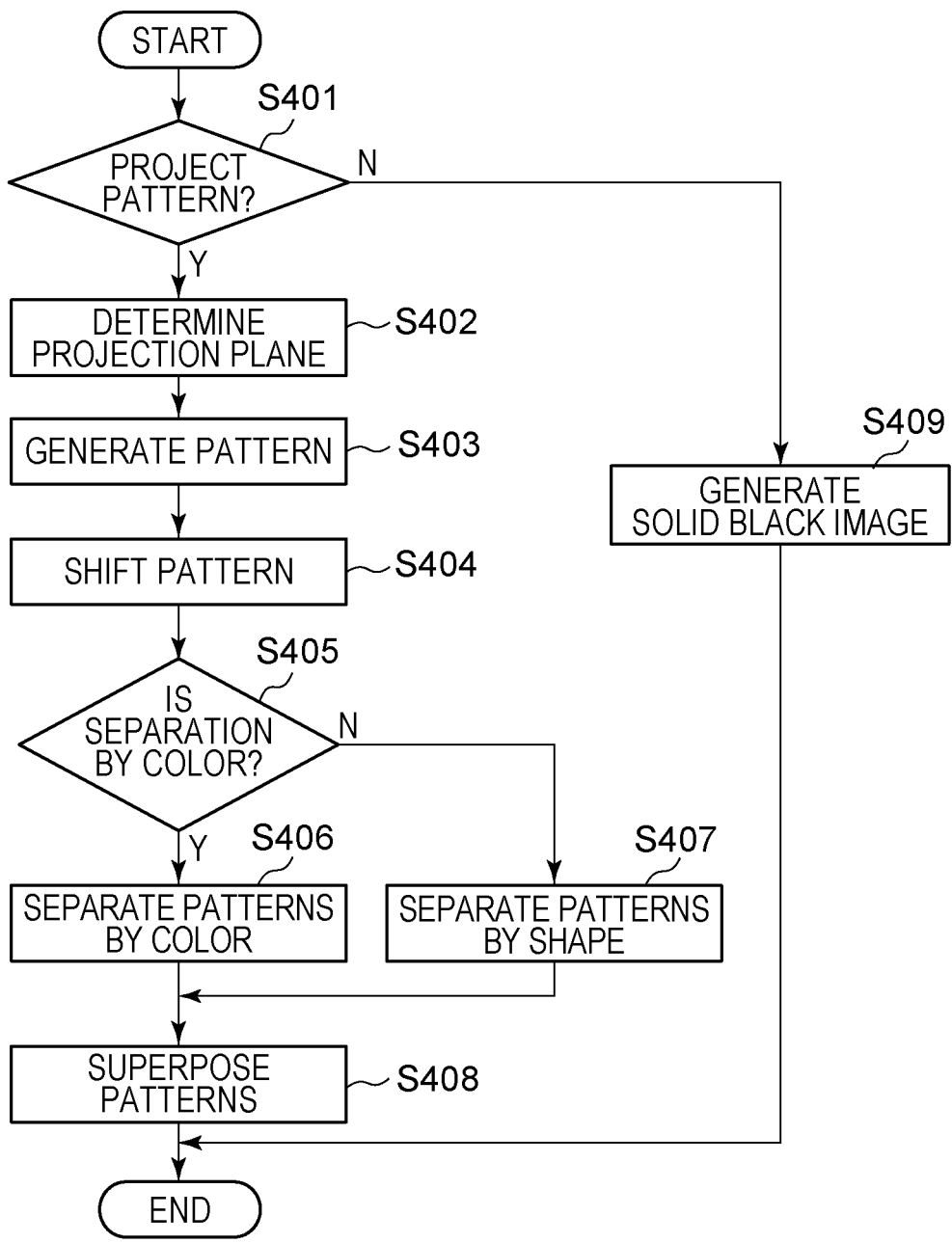
FIGS. 18A and 18B are flowcharts of the image processing system of the fourth embodiment.

The above processing procedure will be described, in outline, with reference to the flowcharts in FIGS. 18A and 18B. The procedure of the overall control method is the same as the procedure in FIG. 7A. FIG. 18A is a detailed flowchart for the superposed-pattern generation processing at S1001 in FIG. 7A. At S401, the user selects whether to project a pattern image or a solid black image. If projection of a pattern image is selected, the process proceeds to S402. If projection of a solid black image is selected, then the process proceeds to S409 to generate a solid black image. At S402, the user determines the projection plane. At S403, the pattern generation unit 101 generates a pattern image containing dots. At S404, the shape-based superposition unit 112 or the color-based superposition unit 102 shifts the dots to the upper right or the lower right. At S405, the pattern image is separated by color or by shape based on the result of determination on the projection plane at S402. If separation by color is selected, then at S406 the pattern image is separated by color. If separation by shape is selected, then at S407 the pattern image is separated by shape. At S408, the shape-based superposition unit 112 or the color-based superposition unit 102 superposes the pattern images.

Figure 18B:
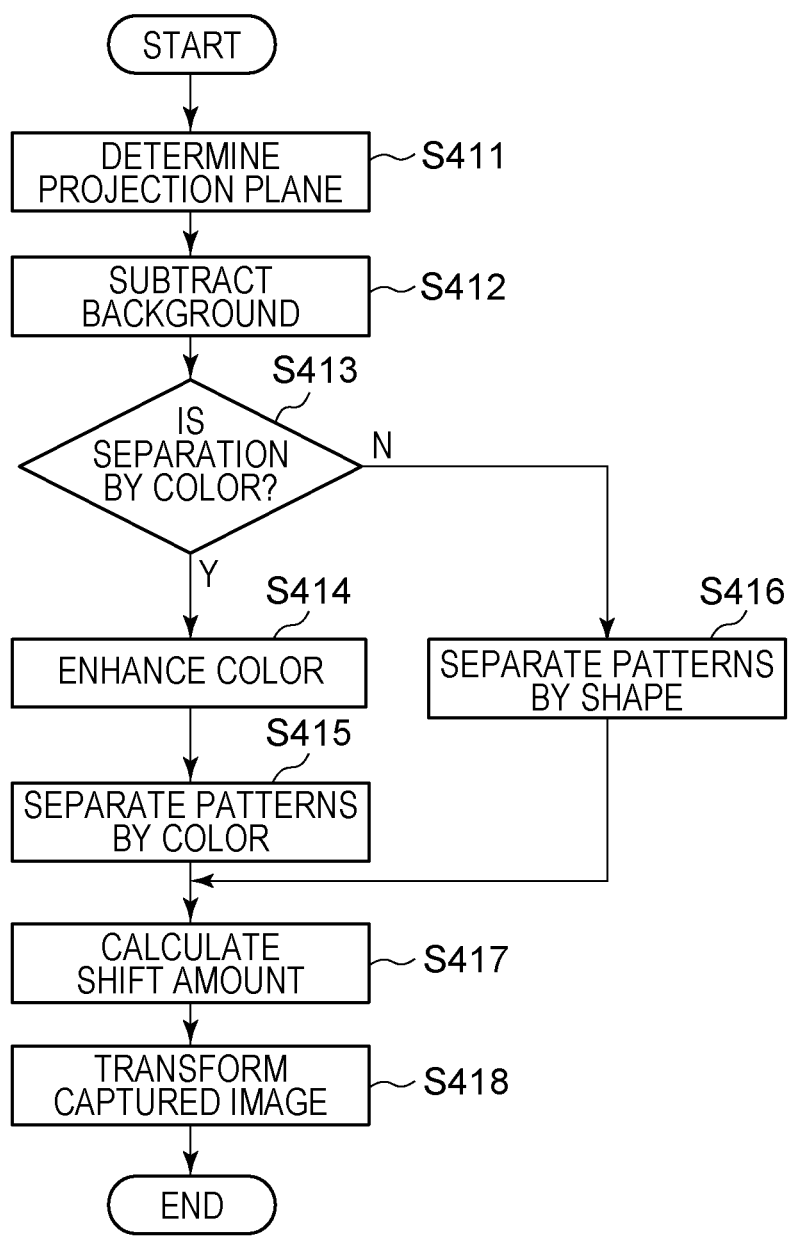

FIG. 18B illustrates a flowchart for the projection pattern generation processing at S1001 in FIG. 7A. At S411, the user determines the projection plane. At S412, the background subtracting unit 110 subtracts the solid black image from the captured pattern image. At S413, the pattern image is separated by color or by shape based on the result of determination on the projection plane at S411. If separation by color is selected, then at S414 the color enhancing unit 111 enhances the color of the pattern image, and at S415 the color enhancing unit 111 separates the pattern images by color. If separation by shape is selected, then at S416 the shape-based separation unit 113 separates the pattern image by shape. At S417, the color-based separation unit 103 or the shape-based separation unit 113 obtains the amount of shape between the objects. At S418, the transformation unit 104 corrects the distortion of the captured image from the amount of shift between the objects.

Thus, the present embodiment allows projecting optimum objects on the projection plane by changing the color or shape of the objects according to the color or the state of the projection plane, preventing a decrease in the transformation accuracy.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, the scope of the following claims are to be accorded the broadest interpretation so as to encompass all such modifications and equivalent structures and functions.

This application claims the benefit of Japanese Patent Application No. 2018-118123, filed Jun. 21, 2018, which is hereby incorporated by reference herein in its entirety.

What is claimed is:

1. An image processing apparatus that transforms distortion of an image projected by a projection apparatus, the image processing apparatus comprising:
    an obtaining unit configured to obtain a captured image acquired by capturing, with an image capturing apparatus, a projected image including a pattern image projected by the projection apparatus,
    wherein the pattern image contains at least three objects having different appearances from one area to another; and
    a transformation unit configured to specify a local area in the captured image and transform the local area based on a positional relationship among the at least three objects in the local area,
    wherein the transformation unit transforms the local area by using a positional relationship between an object of a first appearance and an object of a second appearance in the local area and a positional relationship between the object of the first appearance and an object of a third appearance in the local area,
    wherein the transformation unit calculates a first amount of change between a positional relationship between the object of the first appearance and the object of the second appearance in the local area in the pattern image to be projected by the projection apparatus and a positional relationship between the object of the first appearance and the object of the second appearance in the local area of the captured image,
    wherein the transformation unit calculates a second amount of change between a positional relationship between the object of the first appearance and the object of the third appearance in the local area in the pattern image to be projected by the projection apparatus and a positional relationship between the object of the first appearance and the object of the third appearance in the local area of the captured image, and
    wherein the transformation unit transforms the local area based on the first amount of change and the second amount of change.

2. The image processing apparatus according to claim 1, wherein the at least three objects differ from each other in color.

3. The image processing apparatus according to claim 2, wherein the object of the first appearance, the object of the second appearance, and the object of the third appearance are of any of red, blue, and green colors.

4. The image processing apparatus according to claim 1, wherein the at least three objects differ from each other in shape.

5. The image processing apparatus according to claim 1, wherein the pattern image comprises an image in which a first pattern image, a second pattern image, and a third pattern image are superposed, the first pattern image containing a pattern containing a reference object that is the object of the first appearance, the second pattern image containing a shifted pattern in which the object of the second appearance is disposed at a position to which the reference object is shifted in a first position, the third pattern image containing a pattern in which the object of the third appearance is disposed at a position to which the reference object is shifted in a second direction.

6. The image processing apparatus according to claim 5, wherein the object of the first appearance comprises the reference object,
    wherein the object of the second appearance comprises an object shifted in the first position, and
    wherein the object of the third appearance comprises an object shifted to the second direction.

7. The image processing apparatus according to claim 6, wherein the reference object comprises a dot containing at least one pixel.

8. The image processing apparatus according to claim 7, wherein the first pattern image comprises a dot pattern in which a plurality of dots are disposed in a dispersed manner.

9. The image processing apparatus according to claim 5, wherein the transformation unit holds a first shift amount as the positional relationship between the object of the first appearance and the object of the second appearance in the local area of the projection image, the first shift amount being an amount of shift of the reference object in the first position in generating the second pattern image, and
    wherein the transformation unit holds a second shift amount as the positional relationship between the object of the first appearance and the object of the third appearance in the local area of the projection image, the second shift amount being an amount of shift of the reference object in the second direction in generating the third pattern image.

10. The image processing apparatus according to claim 9, wherein the transformation unit calculates the first amount of change and the second amount of change with reference to the first shift amount and the second shift amount.

11. The image processing apparatus according to claim 10, further comprising a calculation unit configured to calculate a third shift amount indicating the positional relationship between the object of the first appearance and the object of the second appearance in the captured image and a fourth shift amount indicating the positional relationship between the object of the first appearance and the object of the third appearance in the captured image.

12. The image processing apparatus according to claim 11, wherein the transformation unit calculates the first amount of change Scale1$(x, y)$ and the second amount of change Scale2$(x, y)$ as follows:

$$\text{Scale1}(x,y)=(\beta(x)/\alpha(x),\beta(y)/\alpha(y))$$

$$\text{Scale2}(x,y)=(\gamma(x)/\alpha(x),\gamma(y)/\alpha(y))$$

where $\alpha(x, y)$ is the first shift amount and the second shift amount of a reference dot positioned at $(x, y)$, $\beta(x, y)$ is the third shift amount of the reference dot in the captured image, and $\gamma(x, y)$ is the fourth shift amount of the reference dot in the captured image.

13. The image processing apparatus according to claim 12, wherein the transformation unit calculates coordinate values TL, BR, TR, BL of four vertexes of the local area as follows:

$$TL(x,y)=(\text{Center}(x)-\text{Patch\_Size}/2,\text{Center}(y)-\text{Patch\_Size}/2)$$

$$BR(x,y)=(\text{Center}(x)+\text{Patch\_Size}/2,\text{Center}(y)+\text{Patch\_Size}/2)$$

$$TR(x,y)=(\text{Center}(x)+\text{Patch\_Size}/2,\text{Center}(y)-\text{Patch\_Size}/2)$$

$$BL(x,y)=(\text{Center}(x)-\text{Patch\_Size}/2,\text{Center}(y)+\text{Patch\_Size}/2)$$

where Center(x, y) is central coordinates of the local area, and Patch_Size is a length of a side.

14. The image processing apparatus according to claim 13, wherein the transformation unit converts the four vertexes of the local area using the first amount of change and the second amount of change as follows:

$TL'(x,y)=(Center(x)-Patch\_Size/2 \times Scale2(x), Center(y)-Patch\_Size/2 \times Scale2(y))$ $BR'(x,y)=(Center(x)+Patch\_Size/2 \times Scale2(x), Center(y)+Patch\_Size/2 \times Scale2(y))$ $TR'(x,y)=(Center(x)+Patch\_Size/2 \times Scale1(x), Center(y)-Patch\_Size/2 \times Scale1(y))$ $BL'(x,y)=(Center(x)-Patch\_Size/2 \times Scale1(x), Center(y)+Patch\_Size/2 \times Scal1(y))$.

15. The image processing apparatus according to claim 14, wherein the transformation unit estimates a homography based on the converted coordinates of the four vertexes and coordinates of the local area.

16. The image processing apparatus according to claim 15, wherein the transformation unit transforms the local area by executing projective transformation in which the homography is inversely transformed on the local area.

17. The image processing apparatus according to claim 1, further comprising a correction unit configured to correct the captured image based on an image obtained by capturing a projection plane on which the projection apparatus projects a solid black image,
wherein the transformation unit transforms the local area using an image corrected by the correction unit.

18. An image processing method for transforming distortion of an image projected by a projection apparatus, the method comprising the steps of:
obtaining a captured image acquired by capturing, with an image capturing apparatus, a projected image including a pattern image projected by the projection apparatus, wherein the pattern image contains at least three objects having different appearances from one area to another; and
specifying a local area in the captured image and transforming the local area based on a positional relationship among the at least three objects in the local area,
wherein the transforming step comprises transforming the local area by using a positional relationship between an object of a first appearance and an object of a second appearance in the local area and a positional relationship between the object of the first appearance and an object of a third appearance in the local area,
wherein the transformation unit calculates a first amount of change between a positional relationship between the object of the first appearance and the object of the second appearance in the local area in the pattern image to be projected by the projection apparatus and a positional relationship between the object of the first appearance and the object of the second appearance in the local area of the captured image,
wherein the transformation unit calculates a second amount of change between a positional relationship between the object of the first appearance and the object of the third appearance in the local area in the pattern image to be projected by the projection apparatus and a positional relationship between the object of the first appearance and the object of the third appearance in the local area of the captured image, and
wherein the transformation unit transforms the local area based on the first amount of change and the second amount of change.

19. A non-transitory computer-readable storage medium storing instructions that, when executed by a computer, cause the computer to perform a method comprising the steps of:
obtaining a captured image acquired by capturing, with an image capturing apparatus, a projected image including a pattern image projected by the projection apparatus, wherein the pattern image contains at least three objects having different appearances from one area to another; and
specifying a local area in the captured image and transforming the local area based on a positional relationship among the at least three objects in the local area,
wherein the transforming step comprises transforming the local area by using a positional relationship between an object of a first appearance and an object of a second appearance in the local area and a positional relationship between the object of the first appearance and an object of a third appearance in the local area,
wherein the transformation unit calculates a first amount of change between a positional relationship between the object of the first appearance and the object of the second appearance in the local area in the pattern image to be projected by the projection apparatus and a positional relationship between the object of the first appearance and the object of the second appearance in the local area of the captured image,
wherein the transformation unit calculates a second amount of change between a positional relationship between the object of the first appearance and the object of the third appearance in the local area in the pattern image to be projected by the projection apparatus and a positional relationship between the object of the first appearance and the object of the third appearance in the local area of the captured image, and
wherein the transformation unit transforms the local area based on the first amount of change and the second amount of change.

* * * * *